United States Patent
Teicher et al.

(10) Patent No.: US 6,257,486 B1
(45) Date of Patent: Jul. 10, 2001

(54) SMART CARD PIN SYSTEM, CARD, AND READER

(75) Inventors: Mordechai Teicher, Kfar Saba (IL); Robin Townend, Langham (GB)

(73) Assignee: Cardis Research & Development Ltd., Kfar Saba (IL)

( * ) Notice: Subject to any disclaimer, the term of this patent is extended or adjusted under 35 U.S.C. 154(b) by 0 days.

(21) Appl. No.: 09/198,234

(22) Filed: Nov. 23, 1998

(51) Int. Cl.$^7$ .............................. G06K 5/00; G06K 19/06

(52) U.S. Cl. .......................................... 235/380; 235/492

(58) Field of Search ................................. 235/379, 380, 235/487, 492, 493, 486, 375

(56) References Cited

U.S. PATENT DOCUMENTS

| | | |
|---|---|---|
| 4,271,482 | 6/1981 | Giraud . |
| 4,277,837 * | 7/1981 | Stuckert ................. 364/900 |
| 4,341,951 | 7/1982 | Benton . |
| 4,523,087 * | 6/1985 | Benton ................. 235/379 |
| 4,529,870 * | 7/1985 | Chaum ................. 235/380 |
| 4,557,694 * | 12/1985 | Nelson ................. 434/339 |
| 4,575,621 * | 3/1986 | Dreifus ................. 235/380 |
| 4,634,845 | 1/1987 | Hale et al. . |
| 4,689,478 | 8/1987 | Hale et al. . |
| 4,692,601 * | 9/1987 | Nakano ................. 235/380 |
| 4,697,072 * | 9/1987 | Kawana ................. 235/380 |
| 4,705,211 * | 11/1987 | Honda et al. ................. 235/380 |
| 4,707,594 * | 11/1987 | Roth ................. 235/488 |
| 4,766,293 * | 8/1988 | Boston ................. 235/379 |
| 4,797,542 * | 1/1989 | Hara ................. 235/380 |
| 4,859,837 | 8/1989 | Halpern . |
| 4,877,950 | 10/1989 | Halpern . |
| 4,879,455 * | 11/1989 | Butterworth et al. ................. 235/280 |
| 4,882,474 | 11/1989 | Anderl et al. . |
| 4,906,828 | 3/1990 | Halpern . |
| 4,959,788 * | 9/1990 | Nagata et al. ................. 364/408 |
| 4,992,646 | 2/1991 | Collin . |
| 5,030,806 | 7/1991 | Collin . |
| 5,120,939 * | 6/1992 | Claus et al. ................. 235/382 |
| 5,138,119 * | 8/1992 | Demeo ................. 200/5 A |
| 5,140,517 * | 8/1992 | Nagata et al. ................. 364/408 |
| 5,221,838 | 6/1993 | Gutman et al. . |
| 5,233,547 | 8/1993 | Kapp et al. . |
| 5,241,695 * | 8/1993 | Roshitsh et al. ................. 455/128 |
| 5,384,459 * | 1/1995 | Patino et al. ................. 250/229 |
| 5,426,281 | 6/1995 | Abecassis . |
| 5,438,184 | 8/1995 | Roberts et al. . |
| 5,440,634 | 8/1995 | Jones et al. . |
| 5,478,993 | 12/1995 | Derksen . |
| 5,479,528 * | 12/1995 | Speeter ................. 382/115 |
| 5,486,846 * | 1/1996 | Comer et al. ................. 345/168 |

(List continued on next page.)

Primary Examiner—Thien M. Le
(74) Attorney, Agent, or Firm—Needle & Rosenberg PC

(57) ABSTRACT

A smart card, smart card reader, and system for secure entry of a secret personal identification number (PIN) directly into the smart card while the card is presented to the reader. Because the user's PIN is entered directly into the smart card, authenticated directly by the smart card itself, and not propagated outside the smart card, the PIN cannot be covertly obtained through the use of a compromised reader or other device in the system. A PIN keypad on the smart card allows user entry of the PIN, and an authentication unit within the smart card verifies that the PIN is correct. The reader merely supplies electrical power for the smart card to take the PIN entry and perform the authentication, but does not handle the PIN itself in any way. The reader, however, is designed to allow access to the keypad on the smart card while the smart card is being presented. The smart card keypad may have identifying indicia, or alternatively may be not visible, so that photographs, logos, etc., placed on the smart card will not be obscured. In this case, the reader has an overlaying surface with the identifying indicia for the keypad. The reader may also have a separate keypad of its own for use with conventional smart cards that lack a keypad.

26 Claims, 33 Drawing Sheets

U.S. PATENT DOCUMENTS

| | | |
|---|---|---|
| 5,557,516 | 9/1996 | Hogan . |
| 5,606,597 * | 2/1997 | Newland .................................. 379/61 |
| 5,623,547 | 4/1997 | Jones et al. . |
| 5,657,388 * | 8/1997 | Weiss ....................................... 380/23 |
| 5,721,781 * | 2/1998 | Deo et al. ................................ 380/25 |
| 5,757,918 * | 5/1998 | Hopkins ................................... 380/25 |
| 5,777,903 | 7/1998 | Piosenka et al. . |
| 5,793,358 * | 8/1998 | Petkovic et al. ....................... 345/168 |
| 5,797,482 * | 8/1998 | LaPointe et al. ...................... 200/314 |
| 5,815,658 * | 9/1998 | Kuriyama ............................... 395/186 |
| 5,900,599 * | 5/1999 | Ohashi et al. ......................... 200/5 A |
| 5,946,635 * | 8/1999 | Dominguez ............................ 455/558 |
| 5,955,961 * | 9/1999 | Wallerstein ....................... 340/825.33 |
| 5,971,270 * | 10/1999 | Barna ..................................... 235/375 |
| 5,988,902 * | 11/1999 | Holehan ............................... 400/479.1 |
| 6,000,607 * | 12/1999 | Ohki et al. ............................. 235/379 |
| 6,046,730 * | 4/2000 | Bowen et al. ......................... 345/168 |
| 6,047,888 * | 4/2000 | Dethloff ................................. 235/380 |
| 6,057,517 * | 5/2000 | Meyer ................................... 200/5 A |

* cited by examiner

SMART CARD PIN SYSTEM, CARD, AND READER

FIELD AND BACKGROUND OF THE INVENTION

The present invention relates to user authentication and, more particularly, to user authentication for the use of smart cards.

Smart Cards

The term "smart card" herein denotes any device which may be conveniently carried upon one's person and which contains an active internal logic device capable of securely interfacing with and exchanging data with specifically authorized external devices. Smart cards are sometimes referred to as "integrated circuit cards" or "chip cards". Smart cards are generally described by a set of international standards well-known in the art, including, but not limited to publications ISO 7810, ISO 7811, ISO/IEC 7812, ISO 7813, ISO/IEC 7816, ISO/IEC 10373, ISO/IEC 10536, and ISO/IEC 14443, all of which are herein collectively denoted by the term "standards for integrated circuit cards" and incorporated by reference for all purposes as if fully set forth herein. Smart cards are both defined by and based on the standards for integrated circuit cards. Smart cards based on the standards for integrated circuit cards generally conform thereto, where applicable, but also include features not necessarily described therein.

Purposes to which smart cards may be applied include, but are not limited to, performing financial transactions, establishing personal identity, providing access control, managing accounting information, and storing and retrieving personal records and other individual data. Smart cards are characterized by a high level of security, and are the medium of choice for storing sensitive information. A smart card capable of containing monetary instruments for use in financial transactions is herein referred to as a "stored-value smart card". The term "issuer" herein denotes any entity which distributes smart cards for a particular purpose or set of purposes. The term "user" herein denotes any person using, or attempting to use, a specific smart card. The term "authorized user" herein denotes a person who has been given permission, or is "authorized", to use that smart card for a specific purpose or set of purposes. In many cases, the authorized user of a smart card is the owner thereof, but the owner and authorized user need not be the same.

Prior art smart cards include but are not limited to, the various devices illustrated in the accompanying diagrams. FIG. 1A illustrates a smart card 100 substantially similar in external physical size and shape to an ordinary banking card or charge card, having a plastic card body 102 containing an active internal logic device (not shown), and having metallic electrical contacts 104 on the surface of card body 102 for interfacing with external devices and for obtaining electrical operating power therefrom. Normally, a smart card does not have a self-contained source of electrical power, but rather depends on an external device to supply electrical energy for operation (various configurations for powering a smart card are discussed herein). FIG. 1B illustrates an example of a smart card 150 as commercially distributed, usually having various markings printed thereon, such as the issuer's logo 152 or similar trademark, user photograph 154, user name and identifying information 158, and bar code 156 or other means of machine-readable identification independent of the active internal logic device. There is considerable variety in the markings found on commercial smart cards, and those shown in the figures are merely illustrative non-limiting examples. In addition, smart cards are sometimes embossed in a manner similar to that of ordinary charge cards, but the location where embossing is done is restricted to avoid damage to the active internal logic device. Furthermore, smart cards frequently have magnetic stripes on the reverse side (not shown), similar to that of ordinary charge cards.

FIG. 2 illustrates an example of a prior art contactless smart card 200, which is similar to smart card 100 (FIG. 1B), except that there are no electrical contacts 104 (as in FIGS. 1A and 1B). For interfacing with an external device, contactless smart card 200 has an internal radio frequency transceiver and antenna (not shown) to obtain electrical power from the radio frequency carrier transmitted by the external device, and to communicate therewith by radio-frequency transmission. Contactless smart cards are sometimes referred to as "proximity smart cards" or "RF smart cards". Because contactless smart cards can interface with an external device merely by coming into proximity with that external device and without the need for contact therewith, the physical size and shape of contactless smart cards is variable.

Smart Card User Interaction

In addition to interfacing with external devices, a smart card must also be able to interact in some way with the user, although direct exchanges of data with the user are normally limited to a few basic commands from the user and limited information sent to the user (such as a monetary balance held within the smart card). A specialized form of interaction with the user involves the issue of authentication, which is discussed separately below.

Because of the limited interaction of a smart card with the user, only a simple visual display is generally needed to output information from the smart card to the user.

User input to a smart card is in the form of a sequence of symbols, where the sequence contains one or more symbols selectable from a predefined set. The sequence of symbols can represent a desired command, action, choice, selection, or response from the user to the smart card, and in many cases the sequence can consist of a single symbol. The term "symbol" herein includes, but is not limited to, alphabetic characters, numerical digits, words, abbreviations, punctuation signs, typographical marks, written notations, pictorial representations, abstract graphical elements and the like, as well as any combination thereof. Because the symbol set is limited, only a simple keypad is necessary to receive input from the user. The term "keypad" herein denotes any device having distinct user-activatable touch-sensitive, contact-sensitive, pressure-sensitive, or proximity-sensitive areas which respectively represent the different allowable symbols of the predefined symbol set, and which interfaces with another device to signal to that device the areas activated by the user or the symbols corresponding thereto. The terms "enter", "entering", and "entry" herein denote the action, by a user, and the result thereof, of sequentially activating the different areas of the keypad to indicate the different symbols of a sequence. The term "receiving" in the context of an entry into a keypad, or the symbols thereof, herein denotes an active response to the entry or symbols. The term "identifying indicia" herein denotes any features which physically distinguish or identify to a user the different areas of a keypad for the purposes of entering a sequence of symbols. Identifying indicia include, but are not limited to, printed, painted, molded, engraved, layered, laminated, attached, colored, cut, etched, embossed, debossed, raised, recessed, shaped, stamped, textured, electrically displayed, illuminated, imaged, reflecting, projected, punched, and holographic markings. The term "visible identifying indicia" herein denotes identifying indicia which are visible to the human eye. The term "conditionally visible identifying indicia" herein denotes identifying indicia which are visible to the human eye only when certain conditions are met. A keypad need not necessarily have identifying indicia, and these terms as used herein denote separate entities.

Variations of prior art smart cards include devices with additional capabilities for user interaction, such as the prototype combination smart card developed by Smart Card International, Inc., Daytona Beach, Fla. and illustrated in FIG. 3. A combination smart card 400 has a plastic card body 102 and electrical contacts 104, but also contains a visual display 402 and a keypad 404 for user entry of data. In addition to an active internal logic device (not shown), combination smart card 400 also includes an internal battery (not shown) to provide electrical power when used separately from an external device (as previously noted, a typical smart card has no internal source of electrical power, but depends on an external device to supply electricity). Internal sources of electrical power allow a smart card to be operated without relying on any external device. Internal sources of electrical power include, but are not limited to, batteries and solar cells. A combination smart card with an internal solar power cell is disclosed in U.S. Pat. No. 5,777,903 to Piosenka et al. Some combination smart cards can be used not only to view an internal balance, but also as a calculator. Combination smart cards of this sort, sometimes referred to as "super smart cards", however, have not been commercially successful and have not been placed into large-scale production. There are a number of problems with such combination smart cards, including technical problems meeting the specifications contained in the annex to the ISO 7816 standard, with regard to the use of liquid-crystal visual displays (such as visual display 402). The annex to the ISO 7816 standard (*Design and use of Identification Cards having Integrated Circuits with Contacts*) specifies minimum tolerance levels for bending, flexing, and torsion of the smart card. Although combination smart cards are able to meet these specifications for basic smart card functions, the liquid-crystal visual displays used therein typically experience an unacceptably high rate of failure after a moderate amount of flexing and bending. To perform without failure, a liquid-crystal visual display should be maintained in a rigid configuration, and therefore such visual displays are not well-suited to be incorporated into a thin card which is expected to be flexed and bent. Other problems of the combination smart card relate to user and issuer acceptance. The limited lifetime of an internal battery for operation when the combination smart card is not presented to a reader present problems for the user. Even when a solar cell is utilized, however, there is a more serious objection in that issuers do not find the combination smart card commercially acceptable because most of the front of card body 102 is consumed by keypad 404 (FIG. 3), leaving little or no practical room for material such as logo 152, user photograph 154, and additional information 156, 158 (FIG. 1B). Issuers consider the ability to imprint such information on a smart card to be very important for marketing the smart cards to consumers and for normal use of the smart cards.

In addition to the combination smart card as discussed above and illustrated in FIG. 3, devices for similar purposes utilizing different formats have been proposed. For example, U.S. Pat. No. 4,277,837 to Stuckert discloses a portable personal financial terminal for use with data storage cards (similar to smart cards) as well as external devices such as point-of-sale terminals. U.S. Pat. No. 4,877,950 to Halpern discloses a similar device for use as an electronic purse. Both of these devices are self-contained miniature terminals with a keypad, visual display, active logic circuits, memory, interfacing to external devices, and internal source of electrical power. Halpern discloses a method for user authentication by which the user enters his or her secret personal identification number via the keypad of the device prior to presenting the device to a reader. The object of this is to allow a financial transaction between the device and the reader to be executed as rapidly as possible. Both the device disclosed by Halpern and the device disclosed by Stuckert are intended and designed to perform useful functions when not connected to any external device.

Smart Card Readers

The term "reader" herein denotes any device which is capable of interfacing with and exchanging data with a smart card. In general, a reader is capable of both reading data from a smart card and writing data to a smart card. There are a number of different reader configurations known in the art, for handling various smart card applications. There are hand-held and portable readers, counter-top readers, and readers designed to be built in to other devices and equipment. The terms "present", "presenting", and "presentation" with reference to smart cards and readers herein denote the action by which a user causes a smart card to interface with a reader for the purposes of receiving electrical power therefrom and exchanging data therewith. The terms "accept" and "accepted" with reference to smart cards and readers herein denote the action by which a reader enables the interfacing of a presented smart card for the purposes of exchanging data therewith.

Many readers, in addition to having apparatus for interfacing and exchanging data with smart cards, also contain visual displays and keypads suitable for interacting with users. These features of prior art readers, as well as the process of presentation of the smart card, are illustrated in the accompanying diagrams.

FIG. 4A illustrates a prior art reader 500 for a smart card having electrical contacts 104. Reader 500 is contained within a reader case 502 and has a slot 508 for the presentation of a card body 102. Reader 500 may also include a keypad 504 and/or a visual display 506. To present a smart card to reader 500, the user puts card body 102 into slot 508, as shown in FIG. 4B. Note that the generally preferred orientation is for electrical contacts 104 to face up and toward slot 508, as shown in FIG. 4A. This orientation minimizes the amount of frontal area required for the reader and is utilized in all currently-available commercial smart card readers.

Note that part of card body 102 protrudes from slot 508 after presentation (FIG. 4B). This will be the case even when reader 500 is part of an automated banking machine, and therefore reader 500 differs in this respect from current banking machine card reading devices for use with ordinary charge and banking cards, which have a mechanism to bring a card entirely inside the machine where the user cannot gain access. In certain circumstances, the banking machine will retain the card rather than return it to the user. This practice is not acceptable for certain applications of smart cards, particularly those involving financial transactions and personal record-keeping, because the smart card (along with the contents thereof) is generally the personal property of the user rather than property of the issuer (as is the case with ordinary charge and banking cards), and therefore the issuer does not have any right to confiscate or otherwise take possession of a presented smart card, as would be the case for an ordinary charge or banking card. Thus, reader 500 must always allow some portion of card body 102 to be continually accessible to the user.

FIG. 5A illustrates a prior art reader 600 for a contactless smart card. Reader 600 is contained within a reader case 602 and has a proximity area 608 for the presentation of a card body 102. Reader 600 may also include a keypad 604 and/or a visual display 606. To present a contactless smart card to reader 600, the user brings card body 102 close to proximity area 608, as shown in FIG. 5B. For best radio-frequency communication, it is preferable that the plane of card body 102 be parallel to that of proximity area 608, and as close as possible thereto (within approximately 15 centimeters). Aside from this consideration, however, no specific orientation of card body 102 is required. Card body 102 may be rotated or even flipped upside down and reader 600 will still be able to accept the smart card. Furthermore, actual physical contact between card body 102 and reader 600 is unnecessary, provided good radio-frequency communications can be established. Moreover, card body 102 may be presented while enclosed within the user's hand or other object, such as the user's wallet. Despite these considerations, however, note that there is nothing to prevent a reader for a contactless smart card from having a slot or other alignment mechanism, and some readers are designed to accept both smart cards with electrical contacts and contactless smart cards.

Security and Authentication

Many smart card applications do not require extensive security checking. For example, petty purchases, such as a soft drink or a newspaper, do not justify elaborate measures to guarantee that the user is authorized to use a particular smart card to make such a purchase. There are many circumstances, however, when it is necessary to require that the user furnish acceptable proof that he or she is an authorized user of the smart card. The terms "authenticate", "authenticating", and "authentication" herein refer to any process which distinguishes between an authorized user of a smart card and someone who is not authorized.

A commonly-employed prior art method of authentication is to require the user to enter, on a designated keypad, a special sequence of symbols presumably known only to an authorized user. Therefore, the term "secret personal identification number" herein denotes any sequence of symbols associated with a smart card and intended to be known only to an authorized user of that smart card, such that the entry thereof establishes that the user is authorized to use the smart card. The intended function of a secret personal identification number is to prevent users who are not authorized from using the smart card. The terms "challenge", "challenged", and "challenging" herein denote the requiring, either expressed or implied, of a user to enter the secret personal identification number. Naturally, such a challenge does not divulge to the user what the secret personal identification number is, but only that the user must enter the secret personal identification number. If the user correctly enters the secret personal identification number for the smart card, the user is presumed to be an authorized user for that smart card. The secret personal identification number is commonly referred to as a "PIN", and these terms are used herein synonymously.

FIG. 6 is a flowchart conceptually showing the steps of a common prior art authentication method employing a secret personal identification number (PIN) associated with a smart card. In a step 702 a user presents the smart card to the reader, and the smart card is associated with a PIN 704. At a decision point 706, if authentication is not required, the presentation of the smart card is immediately accepted in a step 708. Otherwise, the user is challenged to enter the PIN in a step 710. Note that the challenge may be implicit, where the user already understands the need to enter the PIN and needs no prompting to do so, or the challenge may be explicit, where the user is specifically directed to enter the PIN. Next, in a step 712, a timer 714 is reset and started. Timer 714 is used to determine how long the smart card has been presented and to terminate the authentication process if an excessive amount of time transpires. At a decision point 716, if the user has correctly entered PIN 704, the presentation of the smart card is accepted in step 708. There are a variety of methods well-known in the art for determining if an entry corresponds to a secret personal identification number, some of which do not require knowledge of the secret personal identification number itself. As discussed below, for example, a one-way hash function can be used to compare the user's hashed entry against a stored hash of the secret personal identification number. If these match, then the entry is that of the correct secret personal identification number. Otherwise, the entry is incorrect. In any case, however, the entity verifying the entry does not have to know what the entry is or what the secret personal identification number is. If the user has not correctly entered the PIN, a decision point 718 checks to see if timer 714 has exceeded a predetermined elapsed time limit 720. If elapsed time limit 720 has been exceeded, then the presentation of the smart card is rejected in a step 722. Otherwise, decision point 716 is repeated. Ultimately, therefore, the presentation of the smart card will either be accepted, in step 708, or rejected, in step 722, depending on whether the user enters the correct PIN within predetermined elapsed time limit 720 or not. It is noted that the prior art flow illustrated FIG. 6 is not the only logical sequence utilized in the prior art. For example, the user can enter the PIN into a combination smart card (FIG. 3) prior to presentation of the combination smart card to the reader.

As also noted above, an authentication technique that is well-known in the art is to verify the entered PIN indirectly through the use of a transformation function, such as a hash function. That is, the sequence of symbols as entered by the user is not compared against a stored copy of the PIN, but rather the transformed sequence of symbols is compared against a stored copy of the transformed PIN. This is to prevent a person who obtains the stored copy of the transformed PIN from knowing the PIN itself, and is accomplished by using a mathematical transformation function that is difficult to invert. Such transformation functions are well-known in the art, and are commonly referred to as "one-way" functions. Accordingly, the term "corresponds to" in reference to a comparison of an entered sequence of symbols against stored content for purposes of authentication herein denotes the result of any comparison that verifies the correctness of the sequence of symbols, including the application, as necessary, of a transformation function. Furthermore, the term "associated with", in reference to such stored content, herein denotes that the stored content is used in such a comparison, applying, as necessary, a specific transformation function.

There are common variations on the method illustrated in FIG. 6. For example, some systems employ a variable-length PIN, and this requires the user to indicate that the PIN has been entered upon completion of the entry by pressing a special key on the keypad. Other systems, however, use a PIN of a predetermined fixed length, in which case the user merely has to enter all the symbols of the PIN without indicating completion, because the completion of the entry is implicit in the length of the PIN. There are also some ancillary considerations in the authentication process, which are often incorporated into the method. For example, it is helpful to the user to have some confirmation of the entry of each symbol of the PIN. If there is a visual display, each entry on the keypad can be indicated on the visual display. Usually, a single neutral symbol is repeated on the visual display to indicate each keypad entry, because it is considered poor security practice to show the actual symbols of the PIN on a visual display during entry. An audible signal accompanying each symbol entry is also sometimes used. Also important is an optional feature which disables the smart card if an invalid PIN is consecutively entered more than a predetermined number of times. The rationale for such a feature is that if a smart card is obtained by an unauthorized person, repeated attempts to guess the secret personal identification number by trial and error will most likely result in a series of invalid entries, which cause the smart card to be disabled. In some smart cards, the disabling can be reversed by the issuer (such as when the authorized user has merely forgotten the secret personal identification number), and in other smart cards the disabling is permanent and renders the smart card completely inoperative. The methods of authentication as used herein include the basic method as shown in FIG. 6 and described above, as well as any of these and other variations thereon.

Because the authentication of a user is based solely on the entry of a correct PIN, the terms "authenticate", "authenticating", and "authentication" are also used herein to denote the process of identifying the entry of a sequence of symbols which corresponds to the correct PIN, and the distinguishing such an entry from any other entry (such as that of an incorrect PIN) or the failure to make or complete an entry within the predetermined time limit. The term "authentication unit" herein denotes any device which is capable of determining whether an entered secret personal identification number is the correct secret personal identification number for a particular smart card.

Note, once again, that the "secret personal identification number" is actually associated with, and specific to, the smart card rather than the user. The user establishes his or her identity in terms of the smart card by knowing the secret PIN. Thus, it must be re-emphasized that the authentication discussed herein is an authentication of the user, rather than an authentication of the smart card. As a separate issue, it is necessary for the reader to verify that the smart card is genuine and authorized to participate in a particular data exchange, and it is also necessary for the smart card to verify that the reader is likewise genuine and authorized. Methods of mutual verification between the reader and the smart card are well-known in the art, and usually rely on techniques of modern cryptography. Some examples include the sharing of one or more secret cryptographic keys or derivatives thereof, and the use of public key cryptography and digital signature techniques. The present invention assumes that both smart card and reader are mutually verified by a suitable prior art method.

Limitations of the Prior Art

In order to authenticate a user by employing a secret personal identification number in the manner previously discussed, it is necessary for the user to have access to a keypad at or about the time the smart card is presented. This is currently done by providing a reader which includes a keypad, such as reader 500 with keypad 504 (FIG. 4A). Such a configuration, however, presents a security risk, in that under certain circumstances it is possible for an attacker to discover the secret personal identification numbers of users who present their smart cards to a compromised reader.

To show how this is possible, reference is now made to FIG. 7, which illustrates a block diagram of a prior art reader 800 having a keypad 810 for a user to enter his or her PIN when challenged after presenting a smart card 850. Reader 800 also has an authentication unit 806 for verifying the PIN, a reader processor 802 to control all interactions and handle data flow, and an encryption/decryption/smart card verification module 804. Note that authentication unit 806 is shown conceptually as a separate entity within reader 800, but may be logically incorporated into reader processor 802, encryption/decryption/smart card verification module 804, smart card 850, or within some other device or component. Likewise, encryption/decryption/smart card verification module 804 is shown conceptually as a separate entity within reader 800, but may be logically incorporated into reader processor 802 or some other device. When smart card 850 is presented to reader 800, reader 800 energizes smart card 850 from an electrical power source 808 (denoted in the drawings as "power source" for brevity), which supplies electricity to an electrical power interface 852 (denoted in the drawings as "power I/F" for brevity) inside smart card 850. After smart card 850 is powered and initialized, a secure session 830 is established, through which smart card 850 and reader 800 mutually validate each other and exchange data bidirectionally. Reader processor 802, controls all actions of reader 800 and coordinates the interactions thereof with smart card 850. After presentation of the smart card, if user authentication is required, the user enters the secret personal identification number on keypad 810, and the secret personal identification number is sent to authentication unit 806 which authenticates the user (as previously described and as illustrated in FIG. 6). Authentication unit 806 then signals reader processor 802 accordingly, and if the user is properly authenticated, then session 830 continues. Otherwise, session 830 is terminated. Session 830 is secure because of encryption/decryption/smart card verification module 804, which verifies that smart card 850 is genuine and encrypts all communications thereto. Likewise, smart card 850 contains an encryption/decryption/reader verification module 854, which verifies that reader 800 is genuine, and encrypts all communications thereto. Encryption/decryption/smart card verification module 804 is able to decrypt the communications from smart card 850 for reader processor 802, and encryption/decryption/reader verification module 854 is able to decrypt the communications from reader 800 for a smart card processor 856. Therefore, smart card 850 and reader 800 can readily communicate with each other over session 830 without an attacker being able to read any communications over session 830. Furthermore, an attacker cannot tamper with any of the communications over session 830 without being detected by encryption/decryption/smart card verification module 804 and/or by encryption/decryption/reader verification module 854.

Although smart card—reader session 830 is thereby secure, it is still possible to successfully attack the user authentication process at a point 812 between keypad 810 and authentication unit 806. Keypad 810 sends the sequence of symbols corresponding to the secret personal identification number to authentication unit 806, and therefore the secret personal identification number will be available at point 812. If an attacker compromises reader 800 by making a connection 814 to point 812, then the attacker will thereby obtain the secret personal identification number of the user, and this can be done without the user being aware.

In addition to this vulnerability to a breach of secret personal identification number security, prior art smart card systems can also suffer from another security flaw, regarding the need to allow unprotected access to certain data within the smart card. This limitation concerns the use of "personal smart card readers" by the users themselves. A personal smart card reader is an inexpensive portable device often given to a user of a stored-value smart card in order to be able to conveniently check the current monetary balance of the stored-value smart card. FIG. 8A illustrates a personal smart card reader 900, which is contained in a compact case 902 with a visual display 904 and a slot 906 for inserting a card body 102 of a smart card having electrical contacts 104. Personal smart card reader 900 may be equipped with a keyring 908 to facilitate carrying on the user's person for convenient access. As illustrated in FIG. 8B, when card body 102 is inserted into slot 906, personal smart card reader 900 activates the stored-value smart card, reads the balance therein, and displays the balance 910 on visual display 904 for the user to see. FIG. 8C shows a block diagram of a personal smart card reader 950 containing a personal reader processor 952 and a visual display 954. Note that personal smart card reader 950 does not contain a keypad nor an encryption/decryption/smart card verification module. Therefore, when personal smart card reader 950 establishes a session 840 with smart card 850, session 840 is not a secure session. Any information stored in a smart card which is allowed to be accessible to a personal smart card reader is therefore not secure and may become available to unauthorized persons should the smart card fall into the wrong hands. Normally, only the balance of a stored-value smart card will be made available without authentication, to enable the user to conveniently check the balance of the stored-value smart card with a personal smart card reader. It is not desirable that such information be unprotected, but the limitations of the prior art do not allow a personal smart card reader to be used to display any protected information within a smart card.

Note, once again, that one of the functions of a smart card reader is providing electrical power to the smart card. This is illustrated in FIG. 7 via electrical power source 808 (referred to in the drawings as a "power source" for brevity), as well as in FIG. 8 via battery 956. Both electrical power source 808 and battery 956 send a suitable voltage to electrical power interface 852 (referred to in the drawings as a "power I/F" for brevity) within smart card 850. This is in contrast to the combination smart card (FIG. 3), which has an internal battery (or solar cell) which provides electrical power to the smart card independently of any external device.

Prior art limitations lead to an even more serious security weakness as shown in FIG. 9A, when a smart card 1010 is used for identification purposes with a personal computer 1000. In this example, personal computer 1000 is made of a CPU 1002 which controls a monitor 1004 and receives input from a keyboard 1006. CPU 1002 also interfaces with a reader 1008 which establishes a secure session 1012 with a smart card 1010. Personal computer 1000 may connect to a network (not shown). Smart card 1010 may contain a variety of identification-related data objects and capabilities, such as digital certificates, secret cryptographic keys, and other data objects related to digital signatures and similar verification schemes. In some systems, access to a personal computer may require operator authentication. Connection to a network most always requires some level of operator authentication. A smart card is considered to provide a higher level of confidence in operator identity than the use of passwords alone. FIG. 9B shows a block diagram of the example configuration shown in FIG. 9A. Keyboard 1006 is scanned by a software driver (not shown) in an operating system 1050, which supports the application software 1052 that interfaces with reader 1008. There are many places in this setup at which security can be compromised. The use of a personal computer presents more security hazards than a specialized reader (FIG. 7), because the hardware is not designed to resist tampering, and much of the operation takes place in software that is readily accessible to an attacker. For example, the electrical connections from keyboard 1006 can be tapped at a point 1060 (FIG. 9B), so that an attacker can read or record user input on a line 1062. An attack can also be carried out entirely in software by monitoring the message traffic from operating system 1050 to application software 1052 at a point 1064. In this case, a data output 1066 can be used to obtain sensitive user input, such as the user's secret personal identification number. Furthermore, application software 1052 can be compromised at an internal point 1068, and a data output 1070 can be used to record or redirect user input of the secret personal identification number. As with a dedicated reader (FIG. 7), a configuration with a personal computer can be compromised and sensitive information obtained without the user's knowledge. This particular problem is quite serious, and attempts have been made to remedy the security weakness. For example, Groupe Bull in France has recognized the need for a more secure smart card reader for user authentication and in response has developed the "SafePad" personal smart card reader for use with personal computers. The "SafePad" smart card reader is a compact device which has an internal authentication unit, and is designed to be tamper-resistant. By performing user authentication within such a device, the problems indicated in FIG. 9B are intended to be minimized, because access to the internal components of the "SafePad" reader is harder to attain than access to the internal components and software of a personal computer. It is therefore intended by the manufacturer to be more difficult to compromise the user authentication process with the "SafePad" reader. Nevertheless, no device can be made completely tamper-proof, and so the "SafePad" reader merely isolates the problems indicated in FIG. 9B but does not completely eliminate them.

The devices disclosed by Stuckert in U.S. Pat. No. 4,277,837 and by Halpern in U.S. Pat. No. 4,877,950 also suffer from a security weakness, even though they have built-in keypads. If the user enters his or her PIN prior to presentation of the device to the reader, then the device will authenticate the user prior to presentation and will therefore be activated for use prior to presentation. It is thus possible that the activated device can be used by a person who is not authorized. For example, should the user enter his or her PIN and then, for some reason, not complete the presentation of the device to the reader, the device could remain active for an indefinite period of time. During this time, should the user lose or misplace the device, or should the device be stolen, the previous user authentication may permit subsequent use by someone who is not authorized.

The limitations of the prior art discussed above detract from the security of smart card systems, and consequently undermine user as well as issuer confidence in the employment of smart cards. There is a recognized need for, and it would therefore be highly advantageous to have, a smart card and reader which better maintains security of the user's secret personal identification number and which does not suffer from these limitations, while at the same time preserving the appearance and utility of the commercial smart card as based upon the standards for integrated circuit cards. This goal is met by the present invention.

SUMMARY OF THE INVENTION

The present invention overcomes the above-discussed limitations of the prior art by providing a novel smart card-reader system, wherein the smart card performs the user authentication when presented to the reader, and is normally prevented from doing so when not presented to the reader. This is accomplished by providing an authentication module on the smart card for authenticating the user, which is normally disabled but which can be enabled by the reader when the smart card is presented to the reader. In a preferred embodiment, the authentication module of the smart card contains both a keypad for entry of a user's secret personal identification number (PIN) and an authentication unit for verifying that the proper PIN has been entered. In this manner, user authentication is performed entirely by the smart card without any data manipulation by any external device. Furthermore, by having the authentication module normally disabled and enabled when presented to a reader, the possibility of a pre-authorization and the problems therefrom are removed. Thus, a secret personal identification number entered into a smart card according to the present invention is not subject to the security vulnerabilities of the prior art configurations, because all the prior art points of security weakness regarding the PIN are eliminated. It is therefore an object of the present invention to require that the secret personal identification number be entered directly into the smart card itself and to require that the smart card be presented to the reader during the user authentication process. It is also an object of the present invention to utilize smart cards and readers which are based on the standards for integrated circuit cards. In particular, it is moreover an object of the present invention to utilize smart cards which are based on the standards for integrated circuit cards and which exclude independent internal sources of electrical power and visual displays. It is furthermore an object of the present invention to overcome prior art limitations associated with the commercial objections to utilizing a portion of the smart card surface for a keypad.

Therefore, according to the present invention there is provided a system for authenticating a user, the system including: (a) a reader operative to accepting smart cards and exchanging data therewith; and (b) a smart card for presentation by the user, the smart card being associated with a secret personal identification number and including an authentication module having a smart card keypad for receiving an entry of a sequence of symbols from the user, the authentication module also having an authentication unit for determining whether the sequence of symbols corresponds to the secret personal identification number, and the authentication module being normally disabled and being enabled when the smart card is presented to the reader.

BRIEF DESCRIPTION OF THE DRAWINGS

The invention is herein described, by way of example only, with reference to accompanying drawings, wherein.

DESCRIPTION OF THE PREFERRED EMBODIMENTS

The principles and operation of a smart card, reader, and system according to the present invention may be understood with reference to the drawings and the accompanying description.

Smart Card with Smart Card Keypad and Authentication Unit

Figure 10:
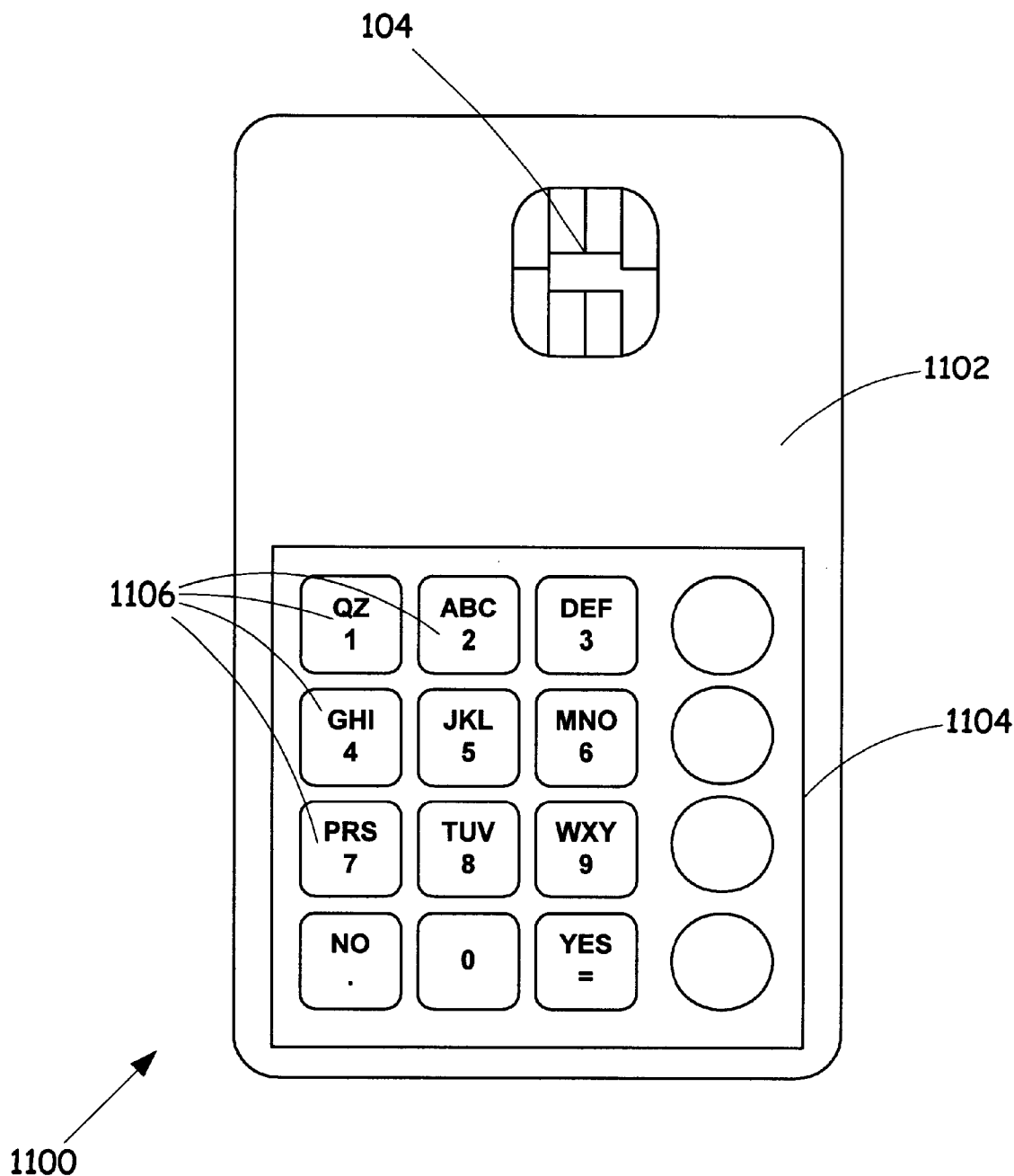
FIG. 10 shows the basic physical appearance of an embodiment of a smart card according to the present invention.

FIG. 10 shows the basic physical appearance of an embodiment of a smart card 1100 according to the present invention. Smart card 1100 includes a card body 1102 and electrical contacts 104, and also includes a smart card keypad 1104 for user authentication. Smart card keypad 1104 is oriented on card body 1102 so that when smart card 1100 is presented to a reader in the generally preferred orientation (as shown in FIG. 10), smart card keypad 1104 will be properly oriented with respect to the user. In this embodiment, smart card keypad 1104 is overlaid with identifying indicia 1106, which in this case are shown as visible identifying indicia. The symbols of identifying indicia 1106 are shown in FIG. 10 in a non-limiting example. The implementation of smart card keypad 1104 can be by any of various means well-known in the art, including, but not limited to, touch-sensitive membrane keypads, capacitive proximity devices, and electrical conductivity sensors. Any device that responds to the user's touch can potentially serve in a keypad. Such a keypad does not require substantial material and can easily be incorporated into card body 1102 without increasing the thickness beyond acceptable limits according to the standards for integrated circuit cards.

Figure 3:
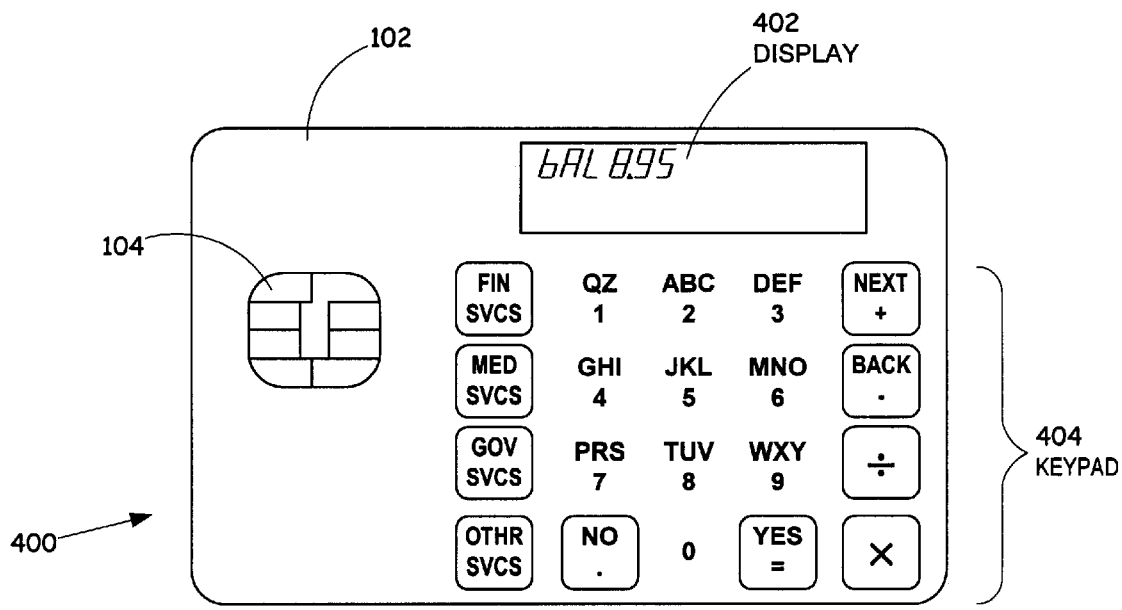
FIG. 3 shows a prior art smart card with built-in keypad and visual display.
Figure 4A:
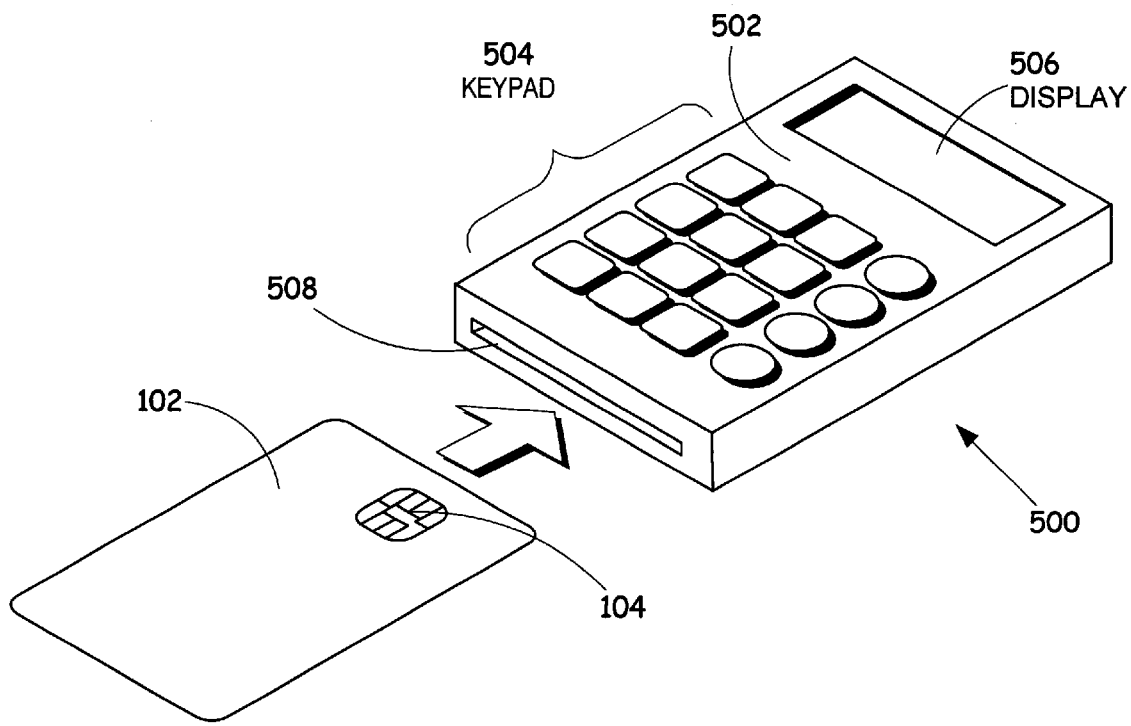
FIG. 4A shows an example of a prior art reader with a smart card ready for presentation.
Figure 4B:
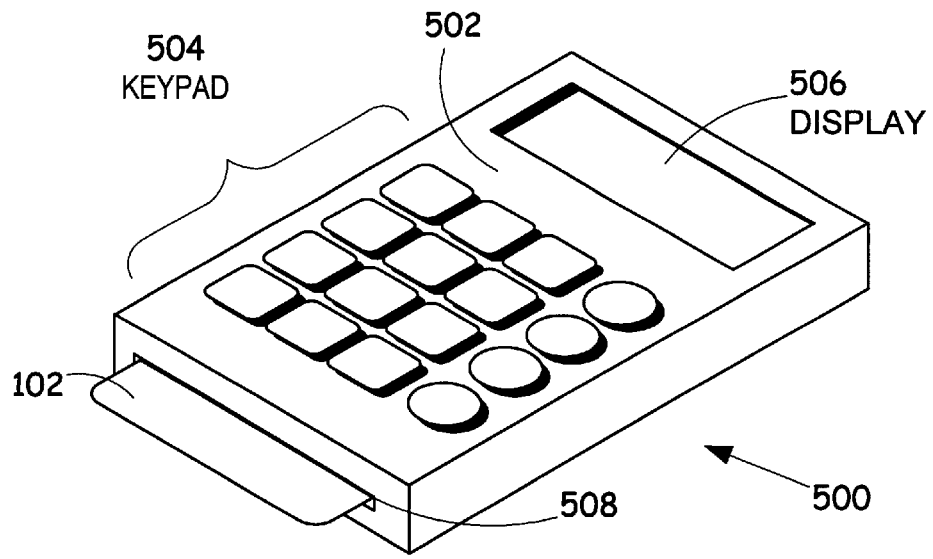
FIG. 4B shows the example prior art smart card reader with a presented smart card.
Figure 5A:
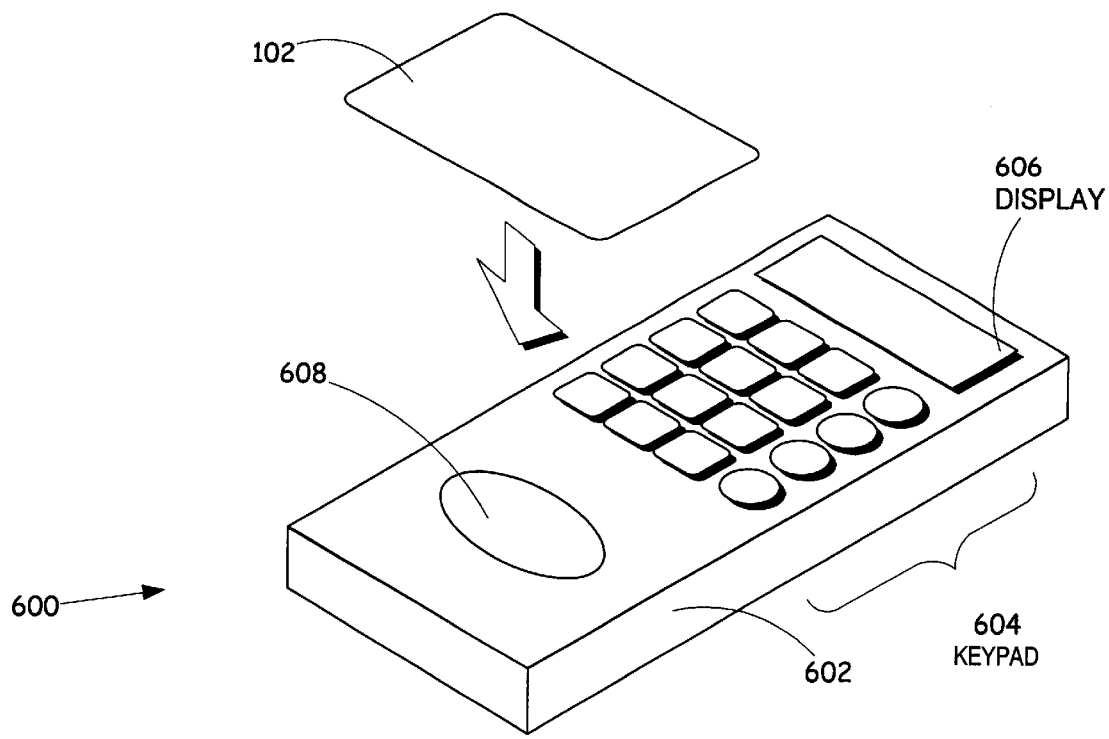
FIG. 5A shows an example of a prior art contactless smart card reader.
Figure 5B:
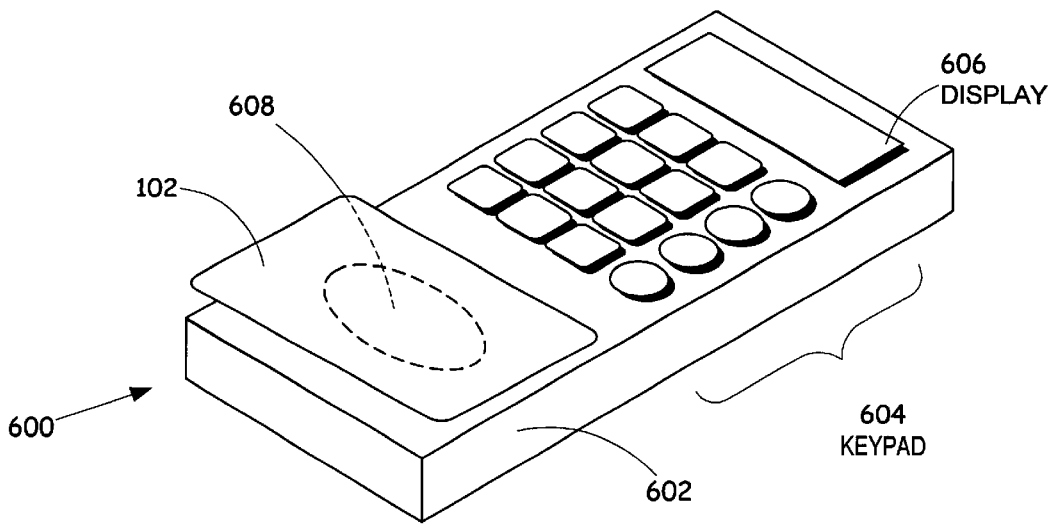
FIG. 5B shows the example prior art contactless smart card reader with a presented contactless smart card.

By providing a keypad for user authentication on the smart card itself, user authentication can be performed in a secure environment free from potential tampering (within the smart card, which is under control and monitoring of the user), and thus the prior art limitations and security weaknesses can be eliminated. It must also be noted, however, that accomplishing user authentication in this manner requires additional elements beyond those shown in FIG. 10, as will be discussed below. In particular, the prior art combination smart card (FIG. 3) has a keypad, but is not necessarily suitable for user authentication because of the lack of these additional elements.

Figure 7:
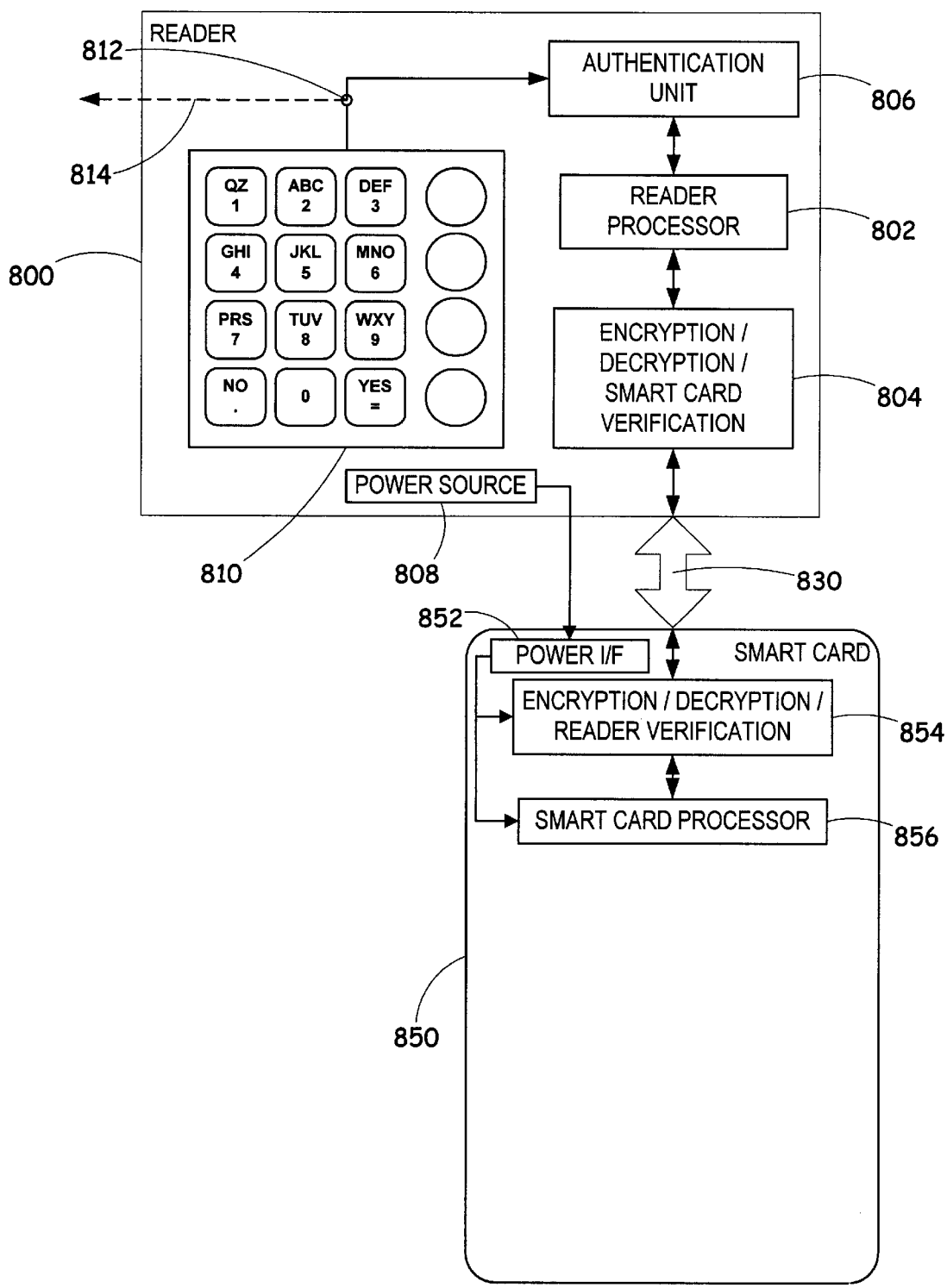
FIG. 7 is a conceptual block diagram of prior art smart card - reader communications.
Figure 11:
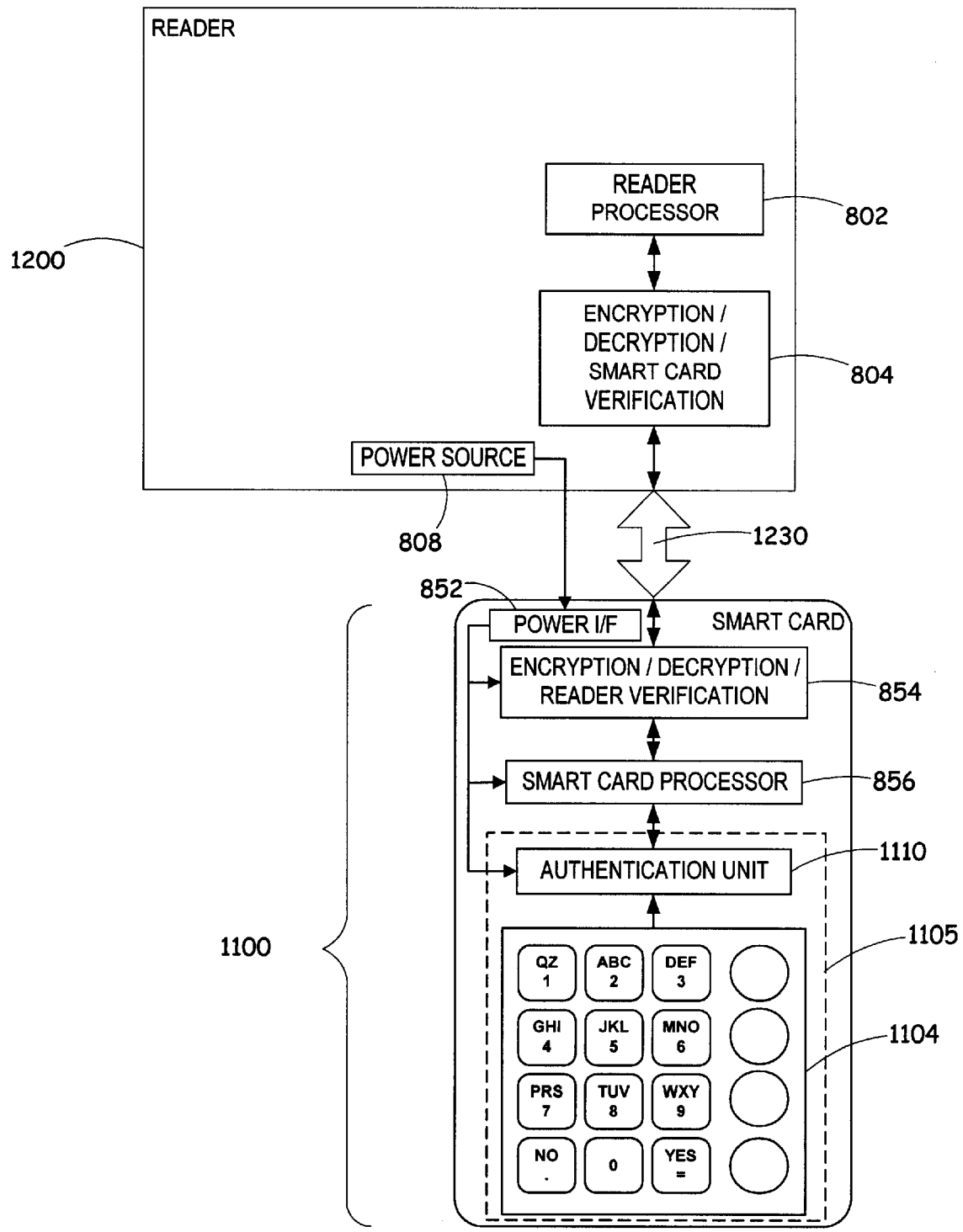
FIG. 11 is a conceptual block diagram of smart card—reader communications according to the present invention.

One of the additional requirements for performing user authentication on the smart card is that there be an authentication unit on the smart card itself, as shown in FIG. 11, which conceptually illustrates the communication between smart card 1100 and a reader 1200. Reader 1200 contains several prior art elements, such as reader processor 802, encryption/decryption/smart card verification module 804, and electrical power source 808. Reader 1200, however, does not need keypad 810 or authentication unit 806 (FIG. 7). Returning now to FIG. 11, it is seen that smart card 1100 also contains several prior art elements, such as electrical power interface 852, encryption/decryption/reader verification module 854 for establishing a secure session 1230 with reader 1200, and smart card processor 856. In addition, however, smart card 1100 also contains an authentication unit 1110. Note that authentication unit 1110 need not be a physically separate device, but alternatively could be logically incorporated into smart card processor 856. The logical combination of authentication unit 1110 and smart card keypad 1104 forms an "authentication module" 1105.

Figure 12:
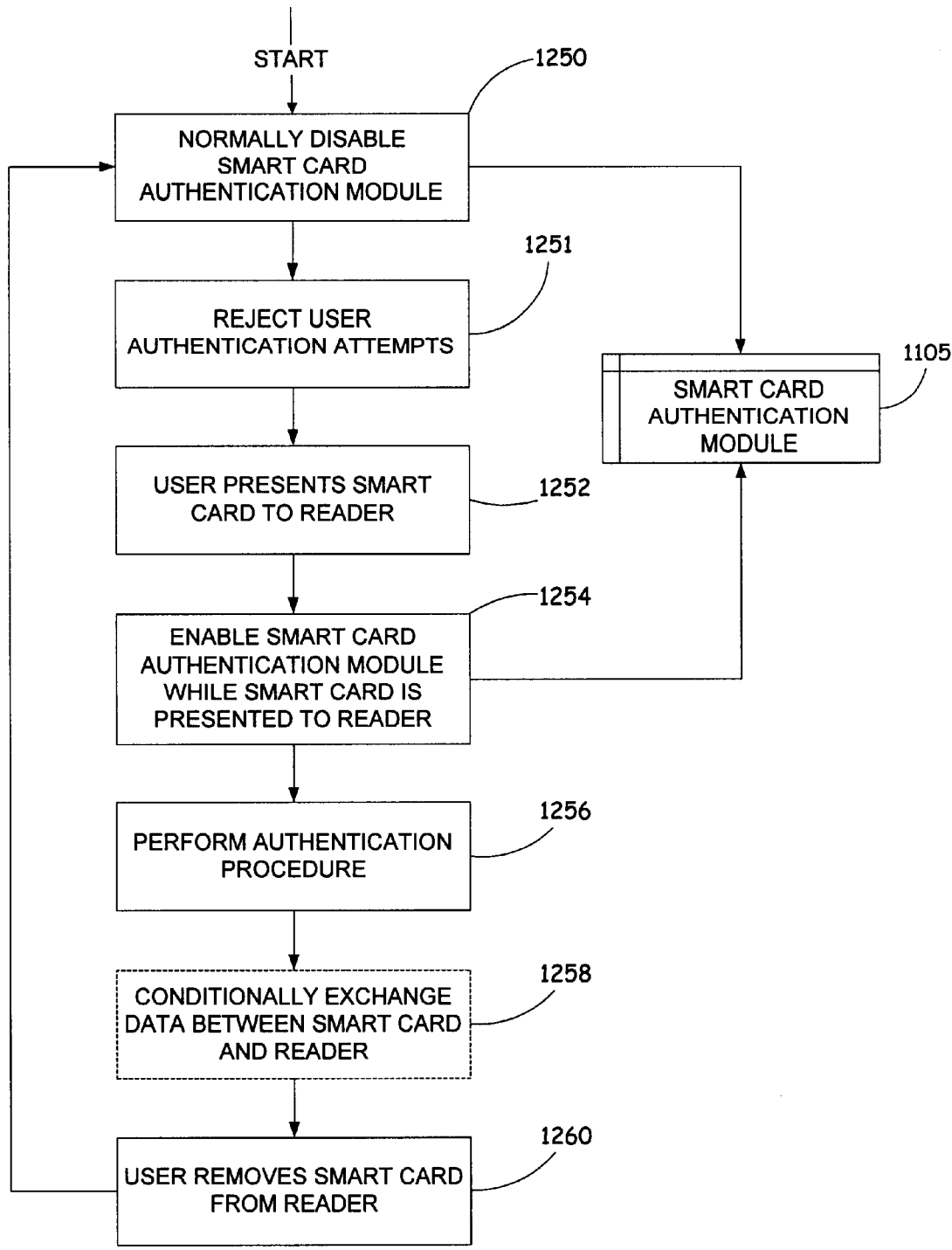
FIG. 12 is a flowchart of the basic smart card authentication module enabling according to the present invention.

FIG. 12 is a flowchart illustrating the sequence of disabling and enabling of smart card authentication module 1105 (FIG. 11) for all embodiments of the present invention. This normal disabling with a selective enabling prevents authentication when the smart card is not presented to a reader and thus eliminates the risk of a pre-authentication remaining active in the smart card. Initially, smart card authentication module 1105 is normally disabled in a disabling step 1250. The disabled state is thus the normal state of authentication module 1105. Any attempt by the user to perform an authentication is rejected in a step 1251. When the user wishes to utilize the smart card, he or she presents the smart card to the reader in a presentation step 1252. At this point, the smart card authentication module is enabled in an enabling step 1254. So long as the smart card remains presented to the reader, smart card authentication module 1105 will be able to perform an authentication. Following this, then, an authentication procedure (such as that of the non-limiting example illustrated in FIG. 6) is performed in a step 1256. Depending on the results of the authentication, the smart card and reader conditionally exchange data in a step 1258. Finally, when the user removes the smart card from the reader in a step 1260, the authentication module is again disabled in disabling step 1250. Therefore, the smart card authentication module normally remains disabled and is enabled while the smart card is presented to the reader.

The various embodiments of the present invention implement disabling step 1250 and enabling step 1254 in different ways, as discussed in detail below.

Figure 6:
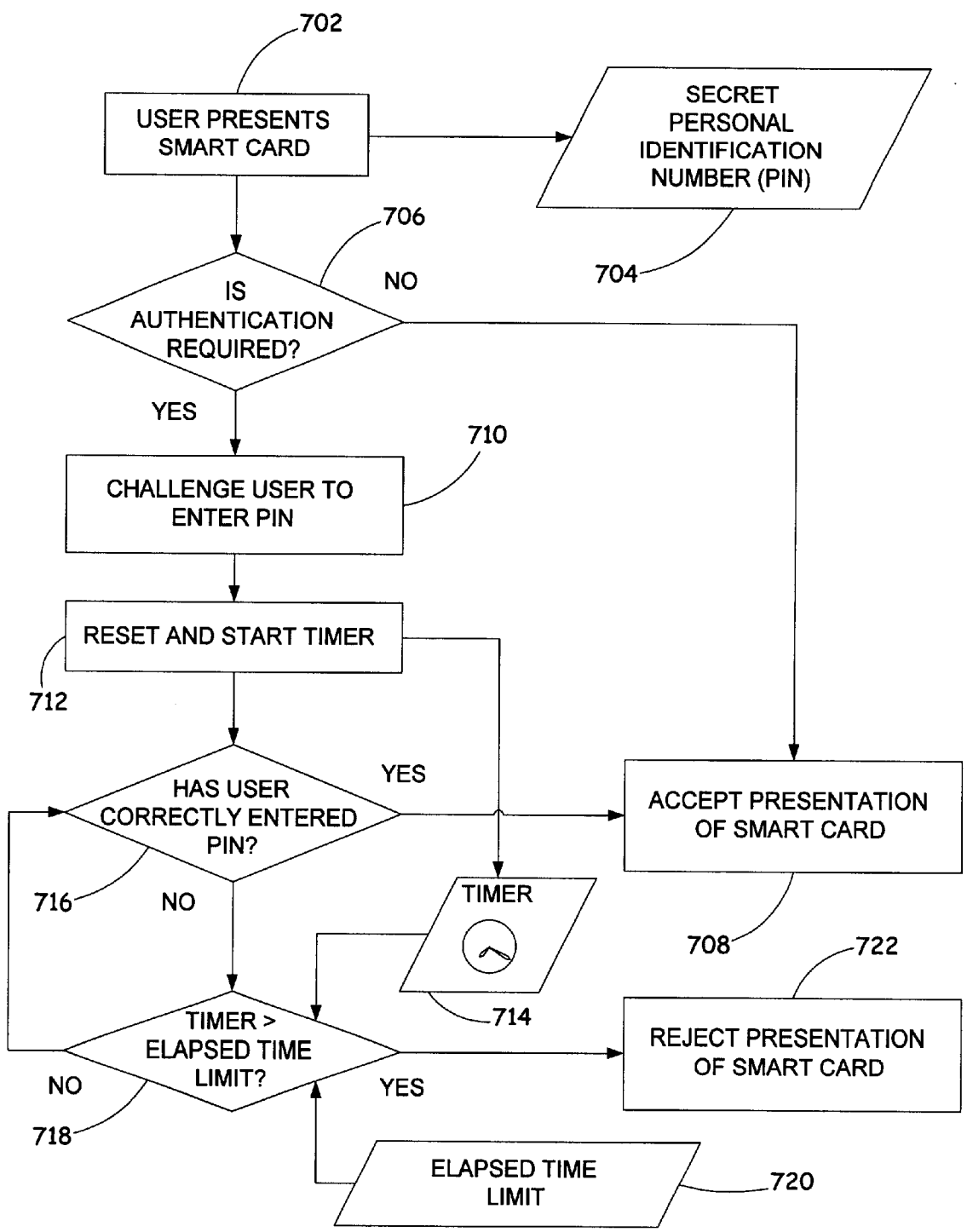
FIG. 6 is a flowchart showing the conceptual steps of a common prior art authentication method.
Figure 8A:
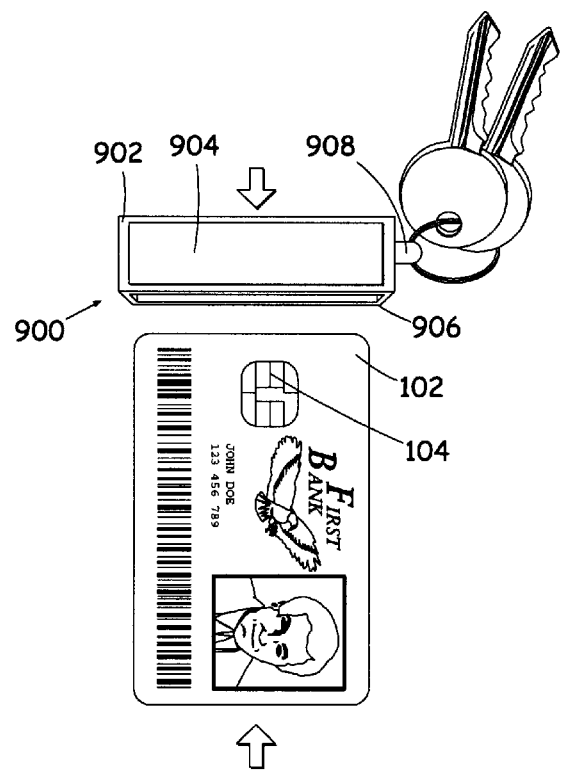
FIG. 8A shows a prior art personal smart card reader with a smart card ready for presentation.
Figure 8B:
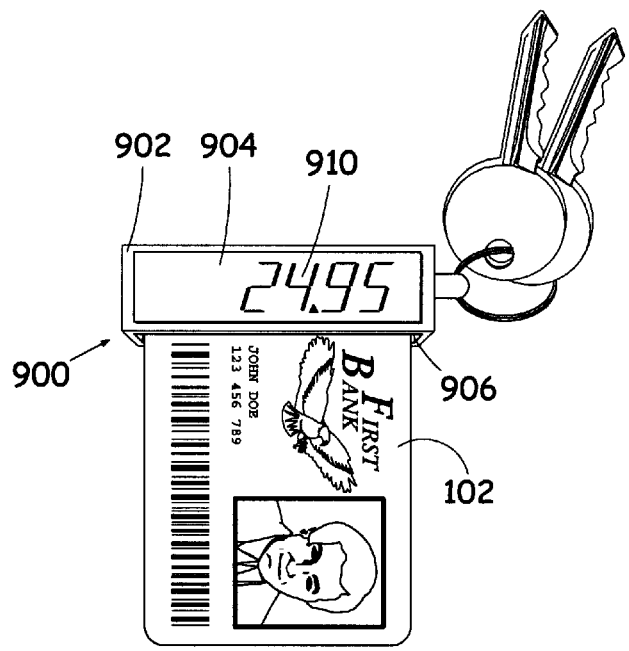
FIG. 8B shows a prior art personal smart card reader with a presented smart card.
Figure 8C:
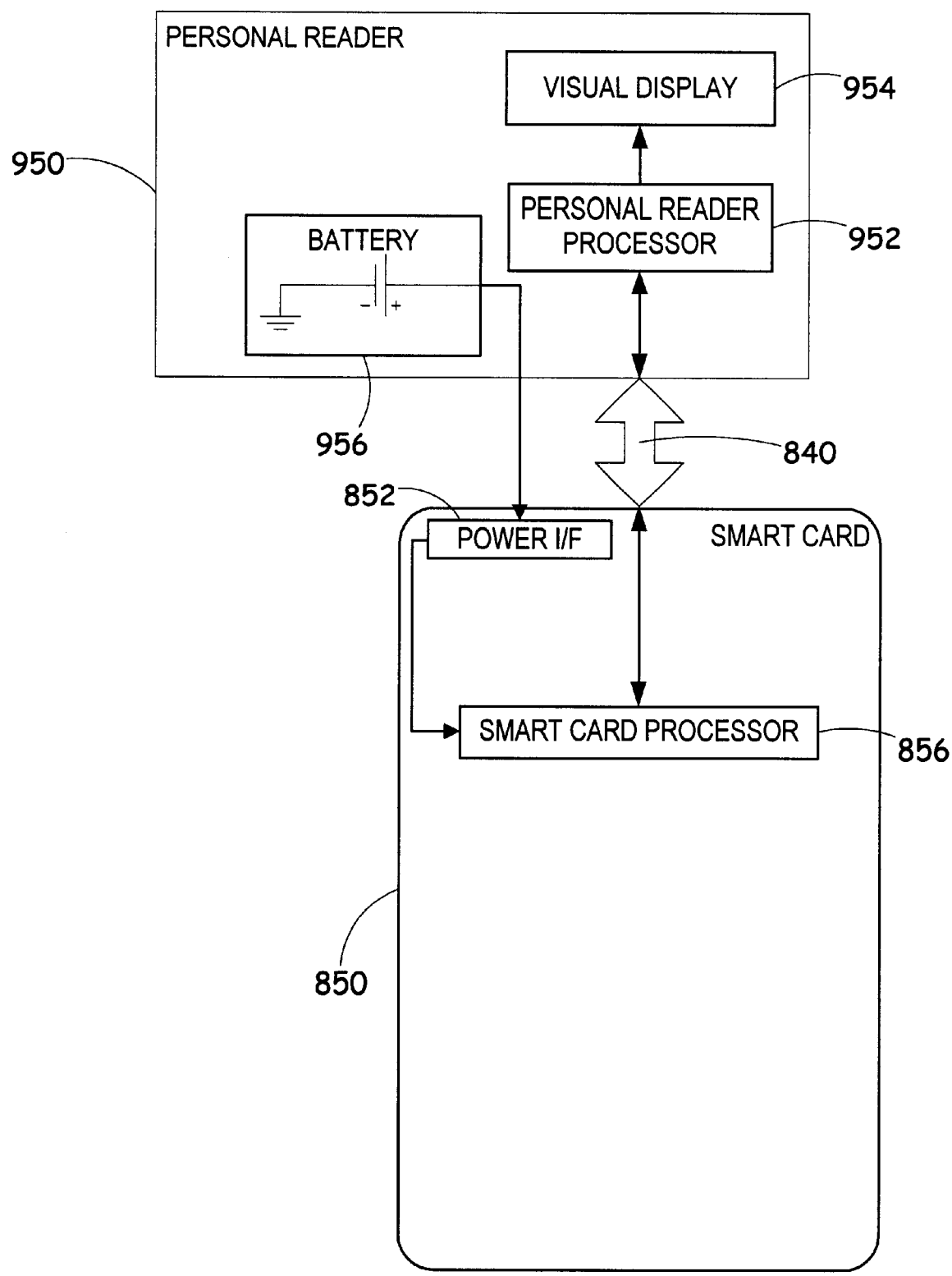
FIG. 8C is a conceptual block diagram of prior art smart card—personal reader communications.
Figure 9A:
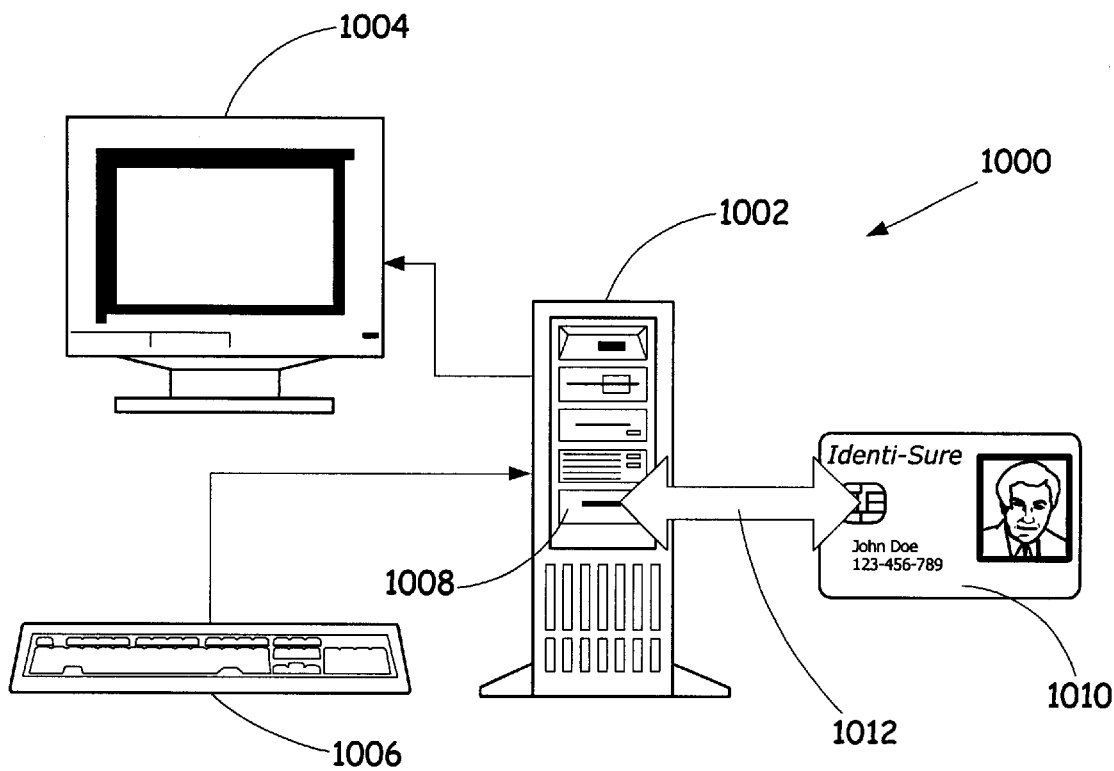
FIG. 9A shows an example of a configuration of a personal computer used in conjunction with a smart card for authentication.
Figure 9B:
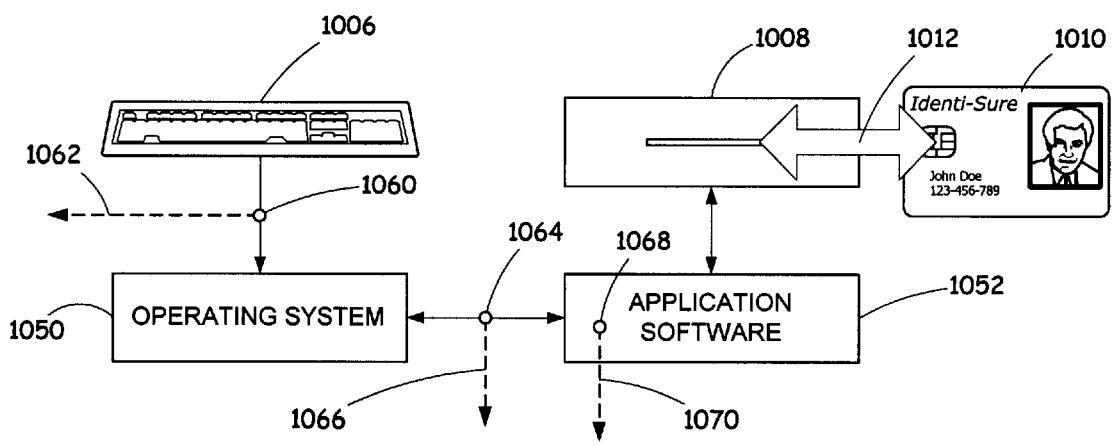
FIG. 9B shows an example of a hardware/software block diagram for a personal computer used in conjunction with a smart card for authentication.

Subject to the disabling and selective enabling of the authentication module as described above and illustrated in FIG. 12, the basic prior art method of user authentication as illustrated in FIG. 6 can be performed with the configuration as illustrated in FIG. 11. The prior art limitations and security weaknesses, as illustrated in FIGS. 7, 8C, and 9B, however, do not apply to the configuration shown in FIG. 11, however, because the secret personal identification number is entered directly into smart card keypad 1104 and does not leave smart card 1100. Furthermore, because the authentication module of the smart card is normally disabled and enabled when presented to the reader, the security vulnerabilities of prior art combination smart cards and similar devices regarding pre-authentication are also eliminated.

It may be desirable for smart card 1100 to send a notification to the accepting external device each time the user enters a symbol into smart card keypad 1104 for confirmation to the user that the symbol has been entered (such as an audible beep). Note, however, that external devices, such as reader 800 (FIG. 7) or personal computer 1000 (FIG. 9A) never handle any actual data related to the user's secret personal identification number. Moreover, with the smart card according to the present invention, use of a personal smart card reader (FIGS. 8A, 8B, and 8C) can be conditioned upon proper user authentication, permitting the protecting of all data in the smart card, while still allowing convenient user access to the data via a personal smart card reader.

Reader with User Access Area

Figure 13A:
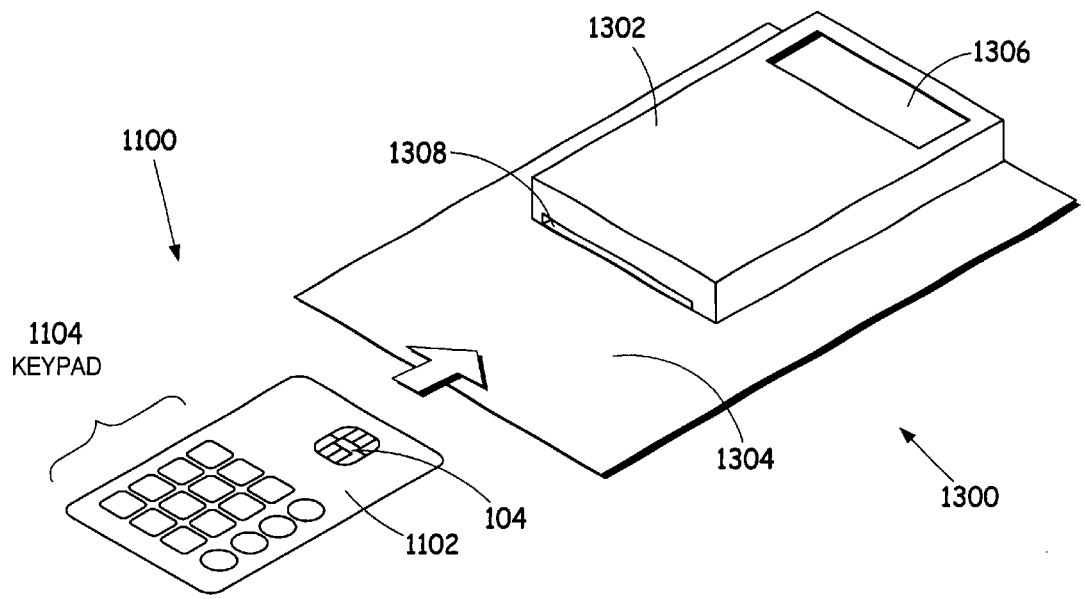
FIG. 13A shows an example of a reader and a smart card ready for presentation according to the present invention.

Another requirement for performing user authentication on the smart card is that the reader allow the user to enter the PIN into the smart card keypad while the smart card is being presented to the reader. FIG. 13A shows a reader 1300 according to the present invention, which is able to accept smart card 1100 to allow user authentication via smart card keypad 1104. Reader 1300 has a case 1302 and visual display 1306 but does not require a keypad for user authentication as is required of a prior art smart card reader (FIGS. 4A, 4B, 5A, and 5B). In addition to a slot 1308 for insertion of card body 1102, reader 1300 also includes a user access area 1304 where the user has physical access to smart card keypad 1104 when smart card 1100 is presented to reader 1300. User access area 1304 is a new feature that is not present in prior art readers for smart cards designed according to the standards for integrated circuit cards. Note that smart card 1100 is oriented so that electrical contacts 104 are toward slot 1308 and smart card keypad 1104 will have the proper orientation with respect to the user.

Figure 13B:
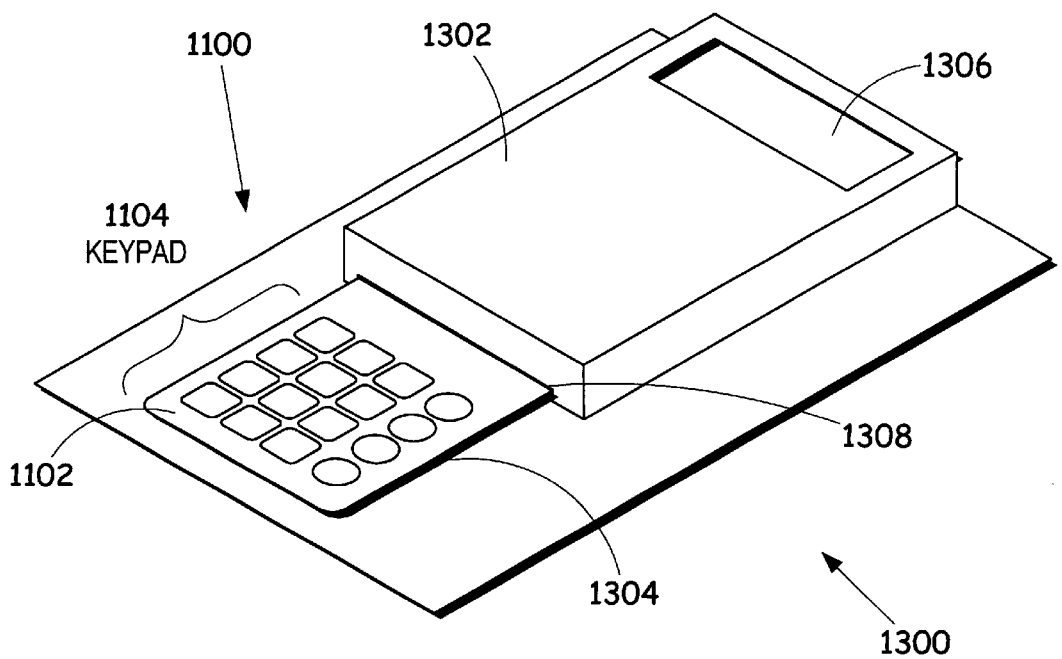
FIG. 13B shows the example reader with a presented smart card according to the present invention.

FIG. 13B shows smart card 1100 presented to reader 1300. In contrast to the presentation to a prior art reader, which takes in nearly all of card body 102 (FIG. 4B) only a small portion of card body 1102 according to the present invention enters slot 1308, in order that smart card keypad 1104 be accessible to the user in user access area 1304.

Figure 1A:
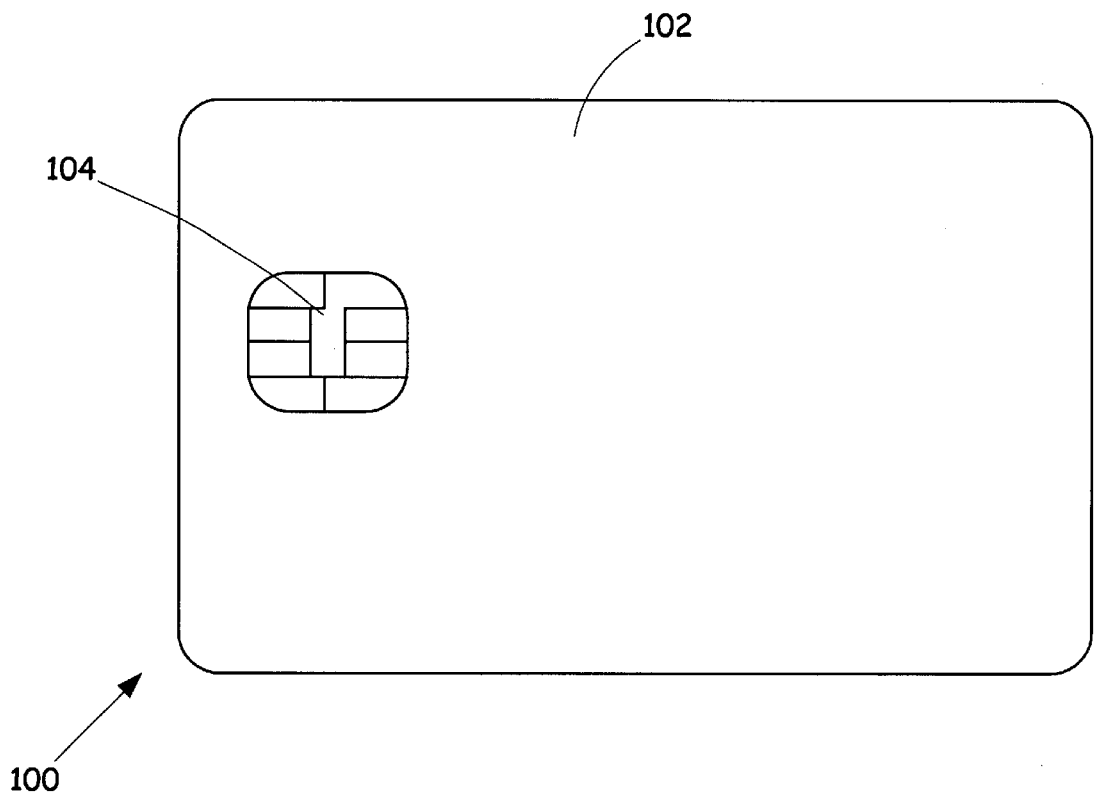
FIG. 1A shows the general appearance of a basic prior art smart card.
Figure 1B:
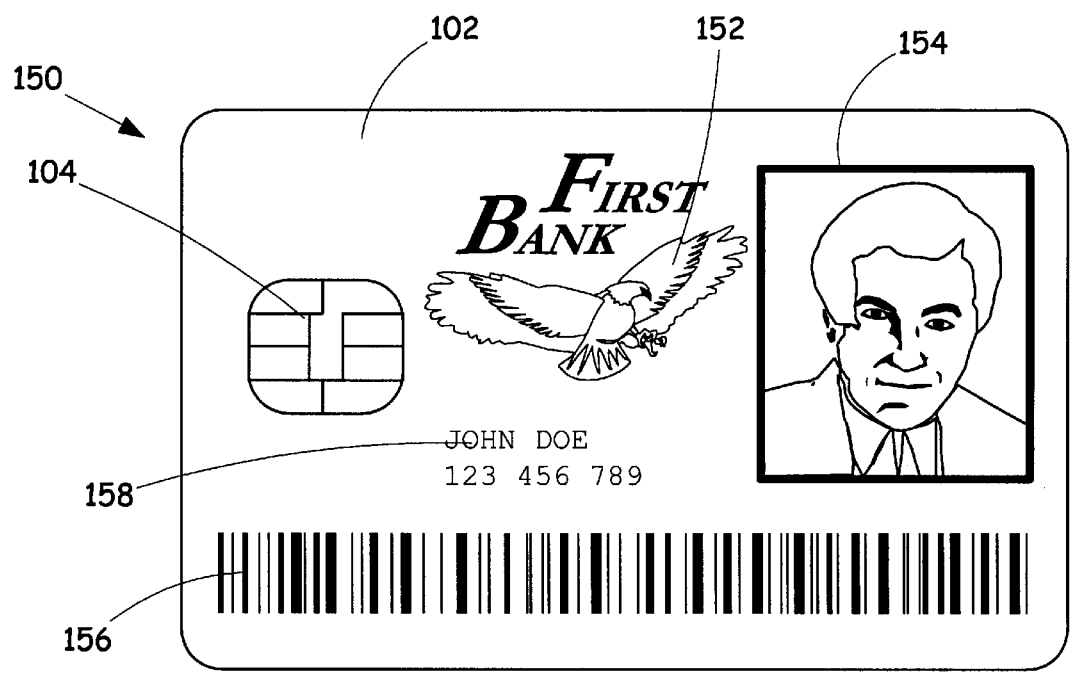
FIG. 1B shows an example of a prior art smart card bearing various markings.
Figure 2:
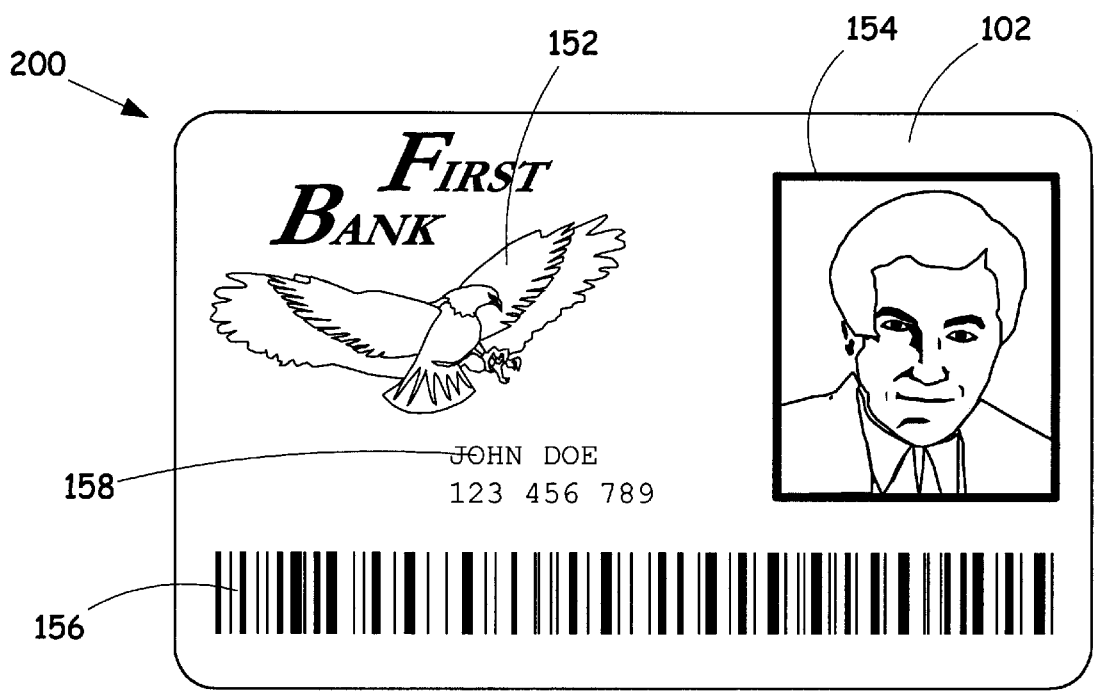
FIG. 2 shows an example of a prior art contactless smart card, also bearing various markings.

Although smart card 1100 (FIG. 10) enables secure user authentication without the limitations of the prior art, identifying indicia 1306 over smart card keypad 1104 can conflict with the use of the surface of card body 1102 for other purposes, such as issuer logo 152, photograph 154, user name and identifying information 158, etc. (FIG. 1B). To allow user authentication via a smart card keypad without such conflict, further embodiments of the present invention provide means for utilizing a smart card keypad without the need for identifying indicia over the smart card keypad.

Smart Card Keypad without Identifying Indicia

Figure 14A:
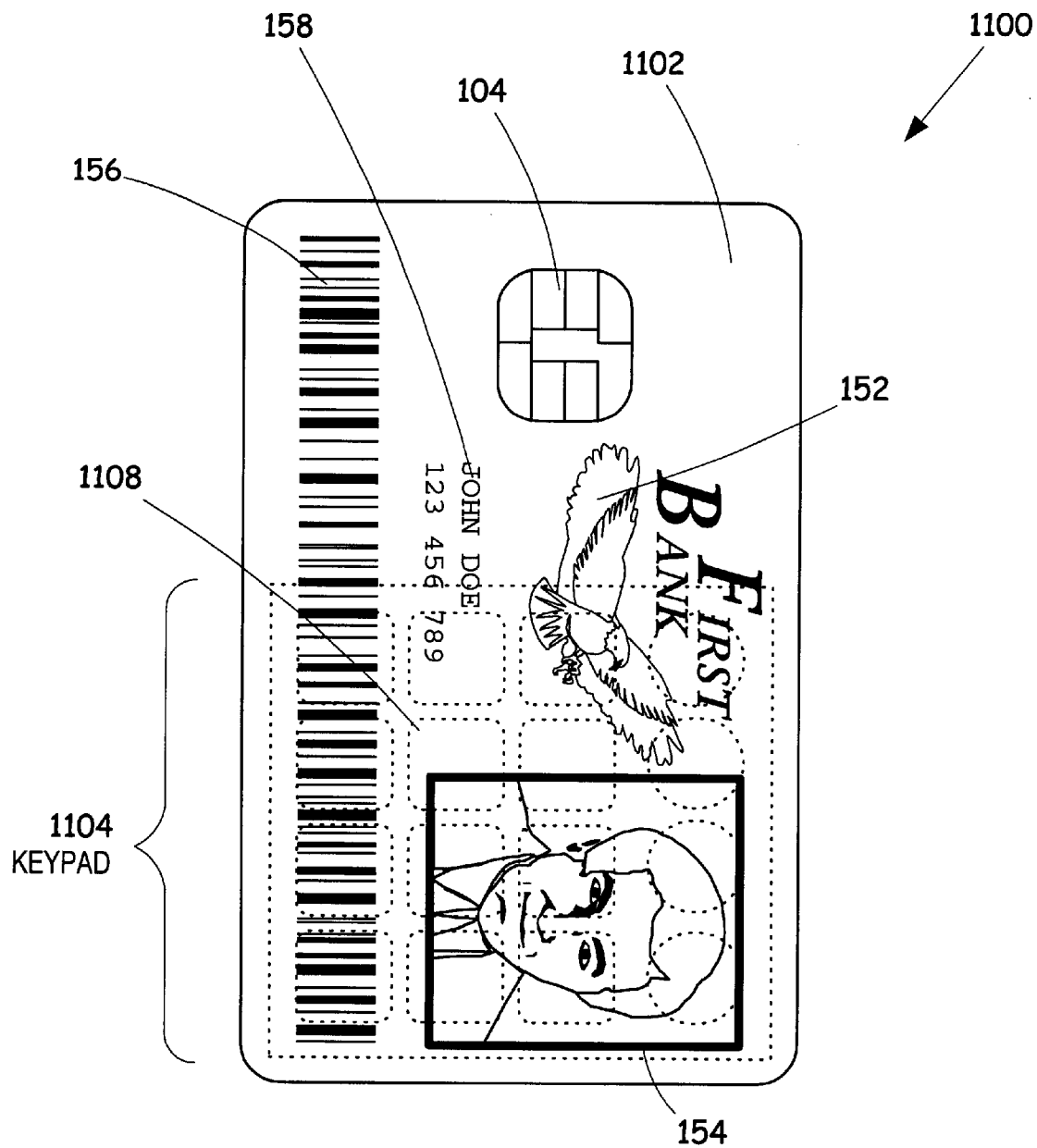
FIG. 14A shows a smart card according to the present invention having a smart card keypad without identifying indicia.
Figure 14B:
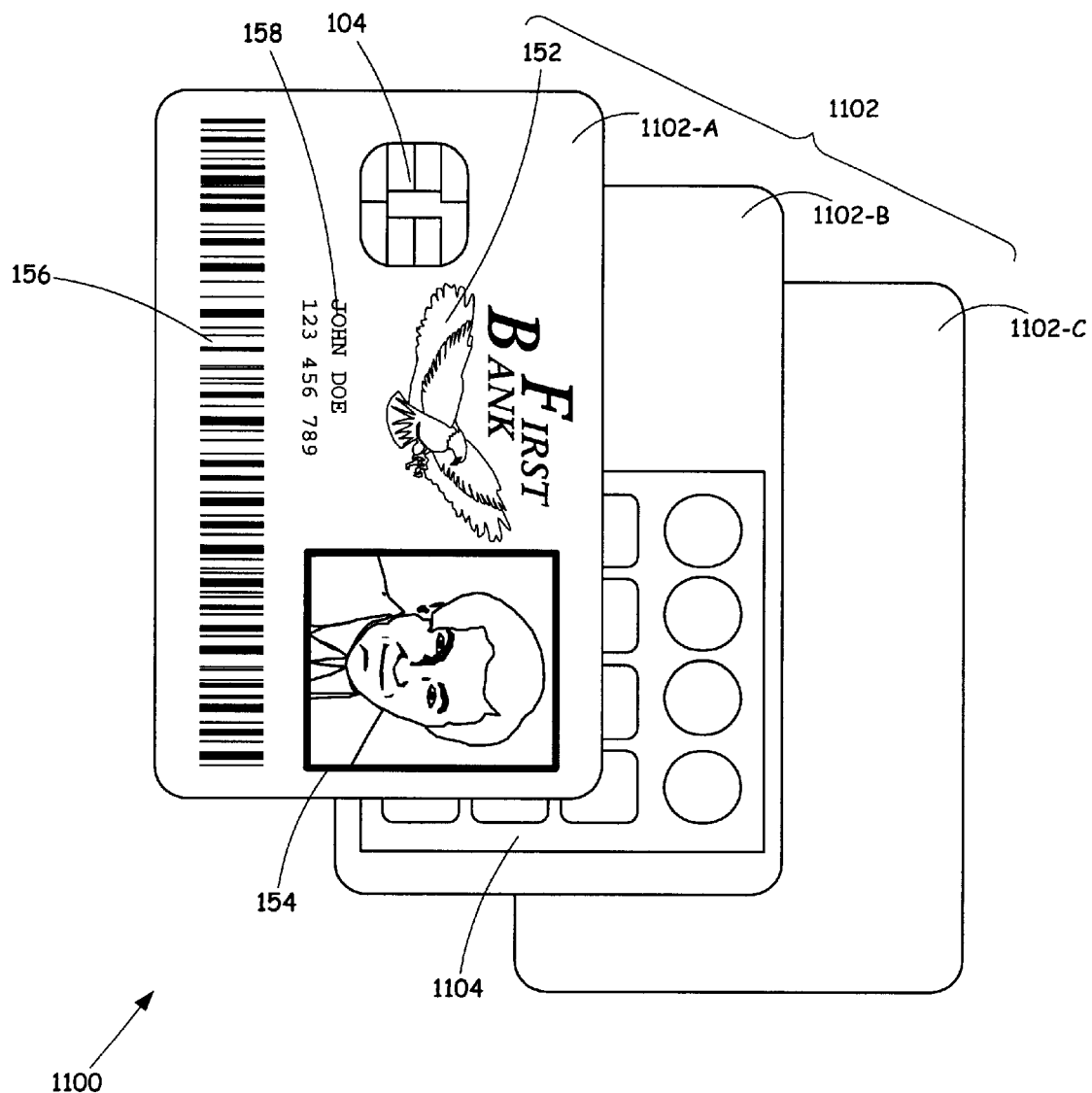
FIG. 14B shows a smart card according to the present invention having a smart card keypad without identifying indicia, wherein the smart card keypad is located within an internal layer of the card body.

FIG. 14A shows smart card 1100 with smart card keypad 1104 but without identifying indicia on the exterior surfaces of card body 1102. A typical region 1108 of smart card keypad 1104 is not visible on the face of card body 1102, so that various graphical elements such as logo 152, user photograph 154, user name and identifying information 158, and bar code 156, may be placed on the face of card body 1102 without obstruction. FIG. 14B shows an embodiment of smart card 1100 wherein card body 1102 has multiple layers including a top layer 1102-A, an inner layer 1102-B, and a bottom layer 1102-C. Smart card keypad 1104 is located on inner layer 1102-B, and there are no keypad identifying indicia on top layer 1102-A, allowing unobstructed space for various graphical elements such as logo 152, user photograph 154, user name and identifying information 158, and bar code 156. Top layer 1102-A is thin and flexible, so that user entries made on the outer surface of top layer 1102-A will activate smart card keypad 1104 within inner layer 1102-B. A user cannot reliably enter a PIN into a smart card having a smart card keypad but not having corresponding identifying indicia on the exterior surfaces thereof. Accordingly, such a smart card is not capable of receiving the entry of a secret personal identification number until some means is provided for identifying indicia to be coupled with the smart card keypad. This is accomplished in various ways in the embodiments of the present invention as discussed below.

Smart Card Keypad with Identifying Indicia on Back Surface

As previously noted, issuers consider it very important to be able to imprint information on the front of a smart card. Issuer logo, user photograph and other information is deemed to be valuable in marketing smart cards and for normal use thereof. The back of the smart card, however, is usually employed only for generic information, however, and in some cases may be available for the placement of a smart card keypad. A smart card keypad on the back of the smart card will therefore not interfere with the placement of information on the front of the smart card.

Figure 15A:
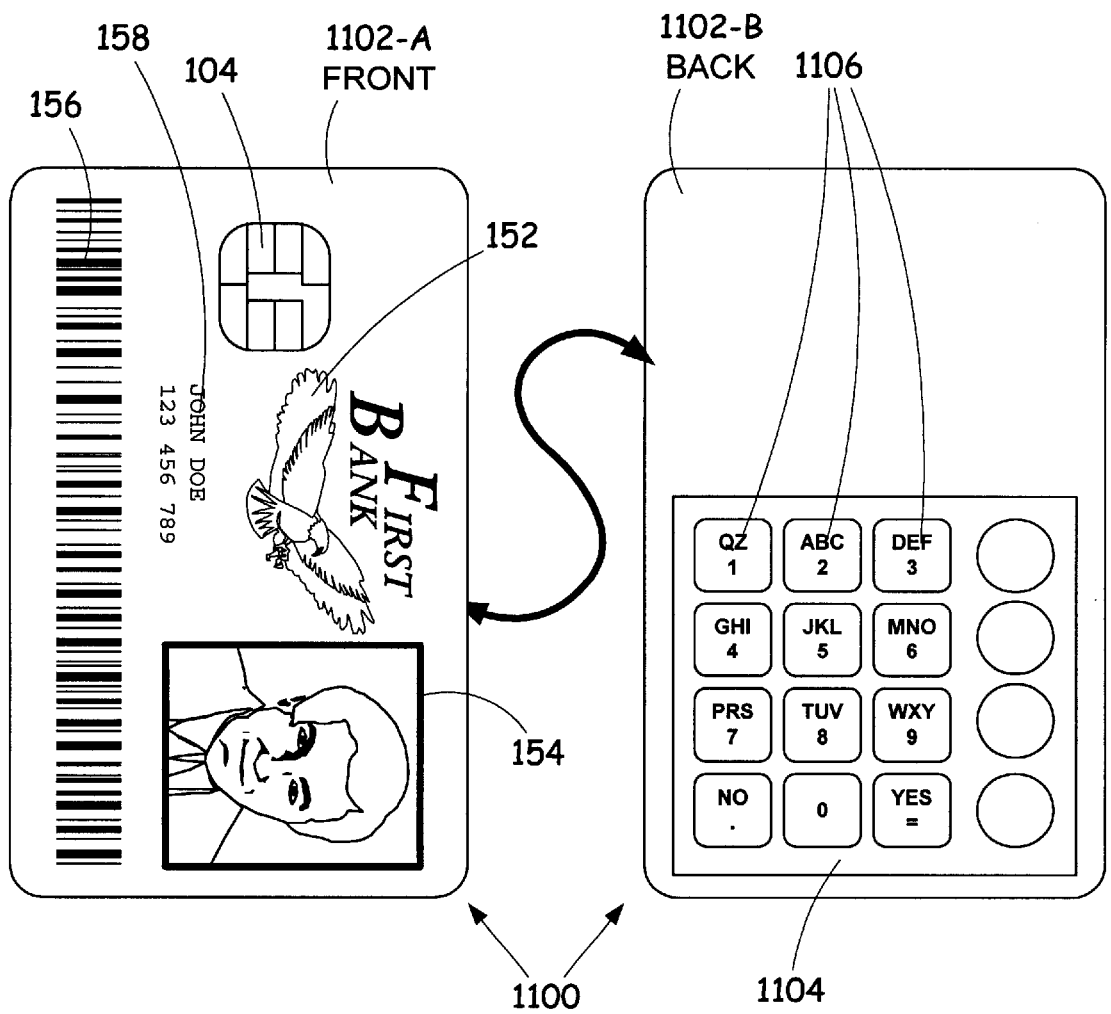
FIG. 15A shows a smart card according to the present invention having a smart card keypad with identifying indicia, wherein the identifying indicia are located on the back of the card body.

FIG. 15A shows a smart card 1100 according to the present invention having smart card keypad 1104 located on a card body back surface 1102-B. There is no significant difference in construction of such a smart card from that illustrated in FIG. 10. In particular, it is possible to use a multi-layer construction as illustrated in FIG. 14B, the only difference being that the touch-sensitivity of smart card keypad 1104 is in the direction of card body back layer 1102-C rather than in the direction of card body front layer 1102-A, and that it is possible to imprint identifying indicia on the outside surface of card body back layer 1102-C without interfering with material printed on front layer 1102-A.

Figure 15B:
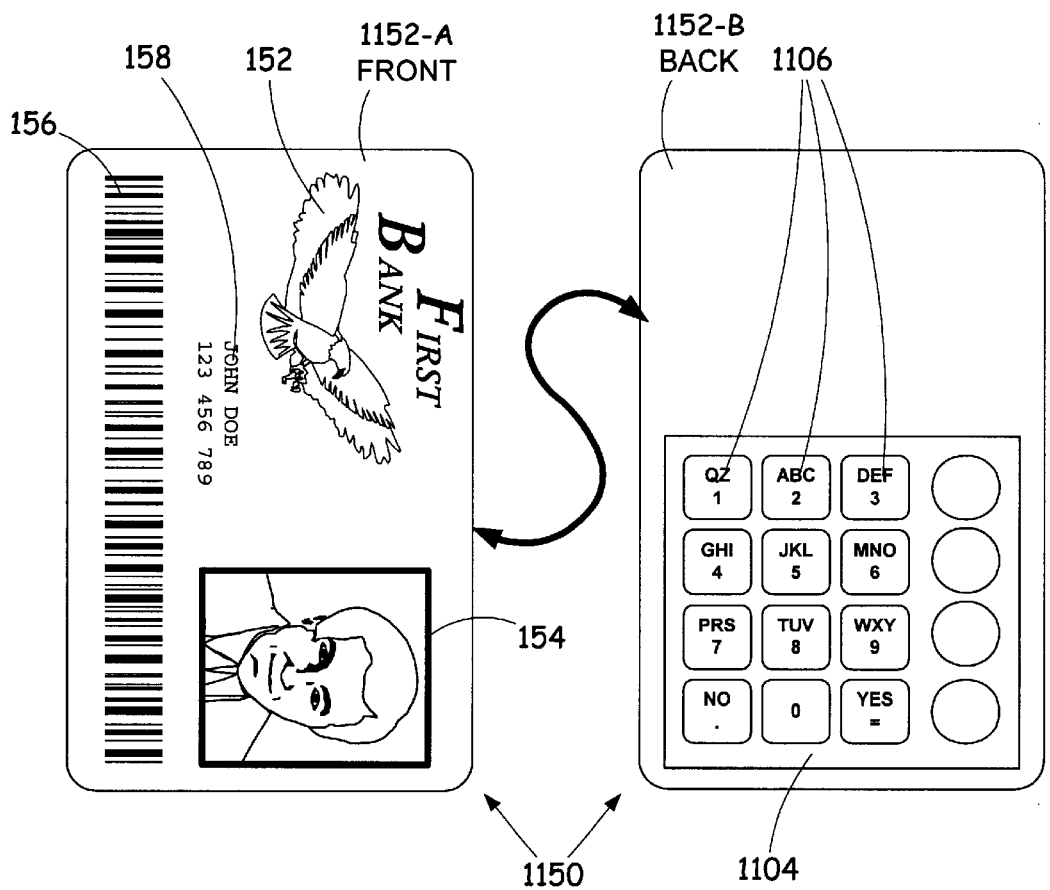
FIG. 15B shows a contactless smart card according to the present invention having a smart card keypad with identifying indicia, wherein the identifying indicia are located on the back of the card body.

FIG. 15B shows a contactless smart card 1150 according to the present invention having smart card keypad 1104 located on a card body back surface 1152-B. It should be noted that for a contactless smart card there is no functional difference between a card body front surface 1152-A and card body back surface 1152-B, because the operation of the internal electronics of contactless smart card 1150 does not depend on the sense of orientation relative to the reader. Therefore, the choice of which surface is to be considered the "front" and which surface is to be considered the "back" is arbitrary. Also note that even though a contactless smart card reader need not make physical contact with the contactless smart card, there is nothing preventing such a configuration from functioning. Consequently, a contactless smart card reader can be configured for presentation of a contactless smart card in exactly the same manner and orientation as shown in FIGS. 13A and 13B. In fact, reader

1300 (FIG. 13A) can be configured for presentation of both smart cards with electrical contacts as well as contactless smart cards by providing both an electrical contact interface and a radio-frequency interface in the same unit, as is done in some current prior art readers.

Figure 15C:
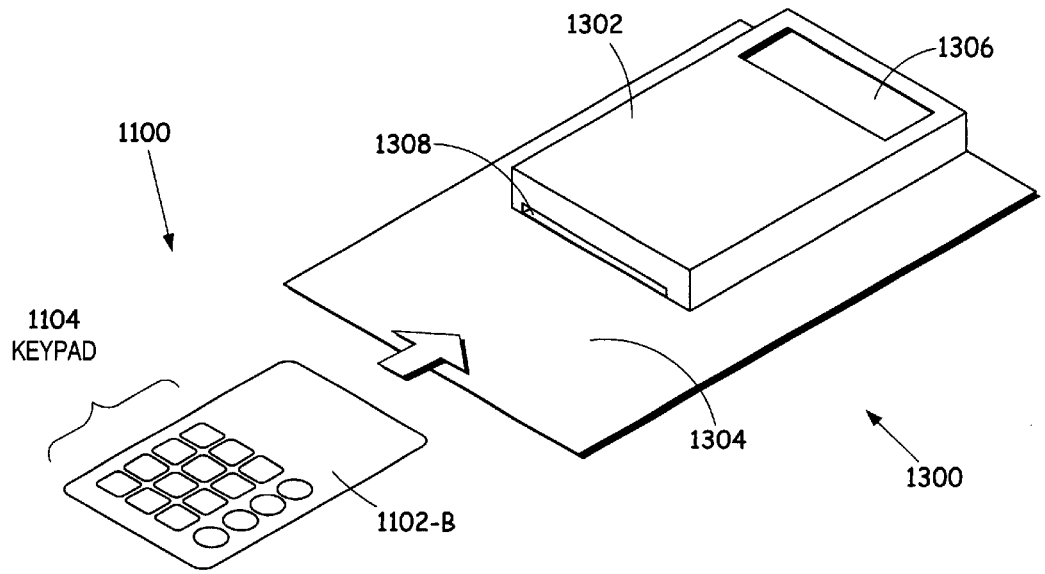
FIG. 15C shows an example of a reader and a smart card ready for presentation, wherein the smart card has a smart card keypad with identifying indicia on the back.

FIG. 15C illustrates reader 1300 ready for presentation of smart card 1100 with smart card keypad 1104 on card body back 1102-B such that smart card keypad 1104 is usable in user access area 1304. Note that, in this orientation, electrical contacts 104 (shown in FIG. 13A; not visible in FIG. 15C) are on the underneath side of smart card 1100 rather than on top. In order to be able to present smart card 1100 in this orientation, therefore, reader 1300 must be able to interface with electrical contacts 104 in this inverted orientation. In this embodiment, smart card 1100 is normally disabled because the authentication module thereof requires electrical power for operation, which smart card 1100 is unable to provide. When smart card 1100 is presented to reader 1300, however, reader 1300 provides electrical power and thereby enables smart card 1100.

Some smart cards are issued with a traditional magnetic data stripe on the back, for compatibility with earlier passive charge card systems. Such a magnetic data stripe may preclude the use of the back of the smart card for a smart card keypad. Magnetic data stripe technology, however, has very low security in comparison with smart card technology, and may pose a security risk. The value of having a smart card keypad on the back of the smart card may therefore outweigh the value of having a magnetic data stripe.

Figure 16A:
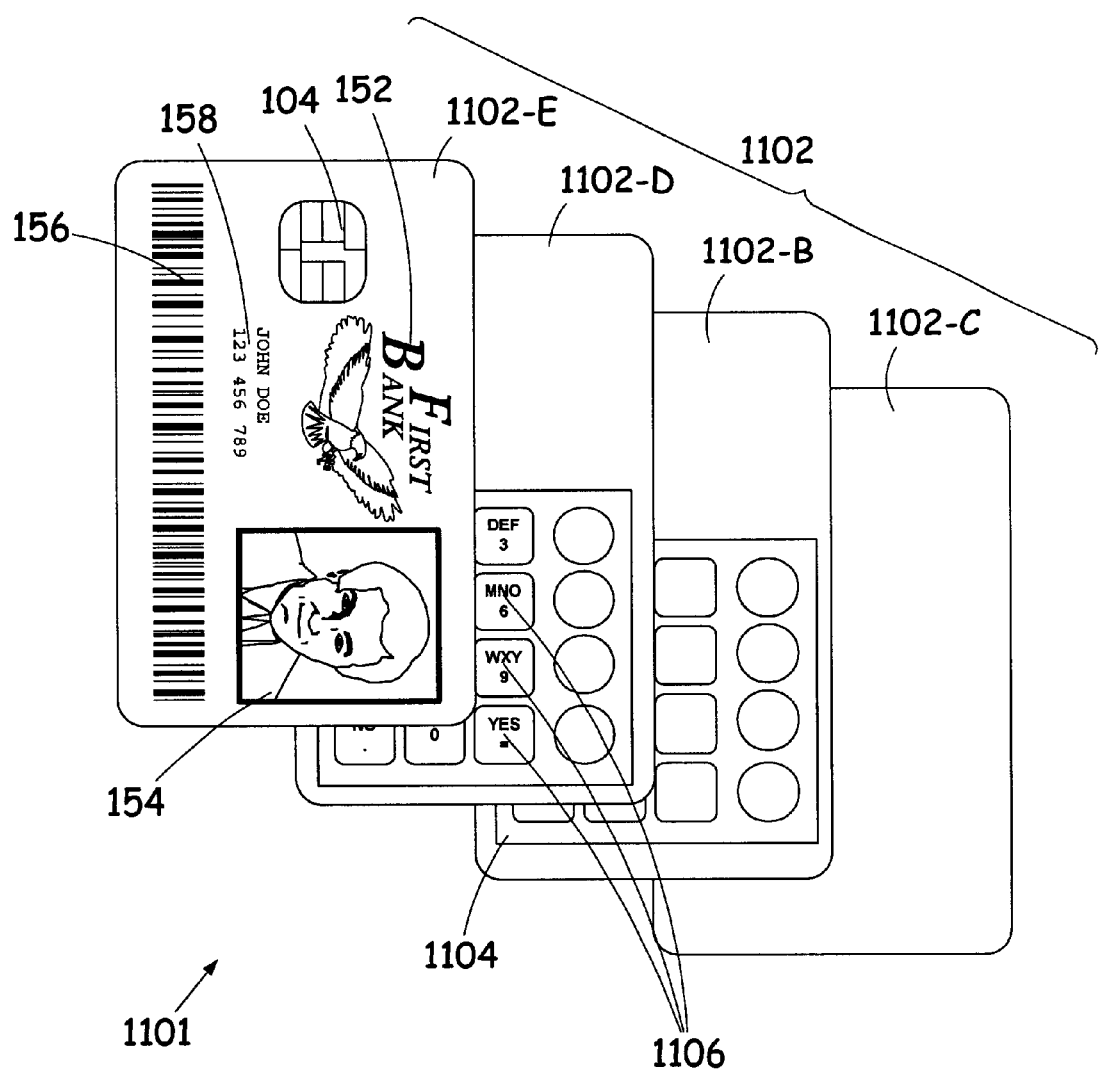
FIG. 16A shows a smart card according to the present invention having a smart card keypad located within an internal layer of the card body over which is a light-emitting layer with conditionally visible identifying indicia.

Smart Card Keypad with Electrically-Illuminated Conditionally Visible Identifying Indicia FIG. 16A shows an embodiment of smart card 1100 wherein identifying indicia 1106 for smart card keypad 1104 are illuminated by light-emitting means, such as a light-emitting layer 1102-D of card body 1102. As shown before (FIG. 14B) smart card 1100 has multiple layers including a translucent top layer 1102-E, an inner layer 1102-B, and a bottom layer 1102-C. Smart card keypad 1104 is located on inner layer 1102-B, and there are no identifying indicia on translucent top layer 1102-E, allowing unobstructed space for various graphical elements such as logo 152, user photograph 154, user name and identifying information 158, and bar code 156. Translucent top layer 1102-E and light-emitting layer 1102-D are thin and flexible, so that user entries made on the outer surface of translucent top layer 1102-E will activate smart card keypad 1104 within inner layer 1102-B. In this embodiment, however, identifying indicia 1106 are conditionally visible identifying indicia, and may be seen through translucent top layer 1102-E when illuminated by light-emitting layer 1102-D. Light-emitting means such as light-emitting layer 1102-D can be implemented by various techniques currently known in the art, a non-limiting example thereof being the familiar electroluminescent panel.

Figure 16B:
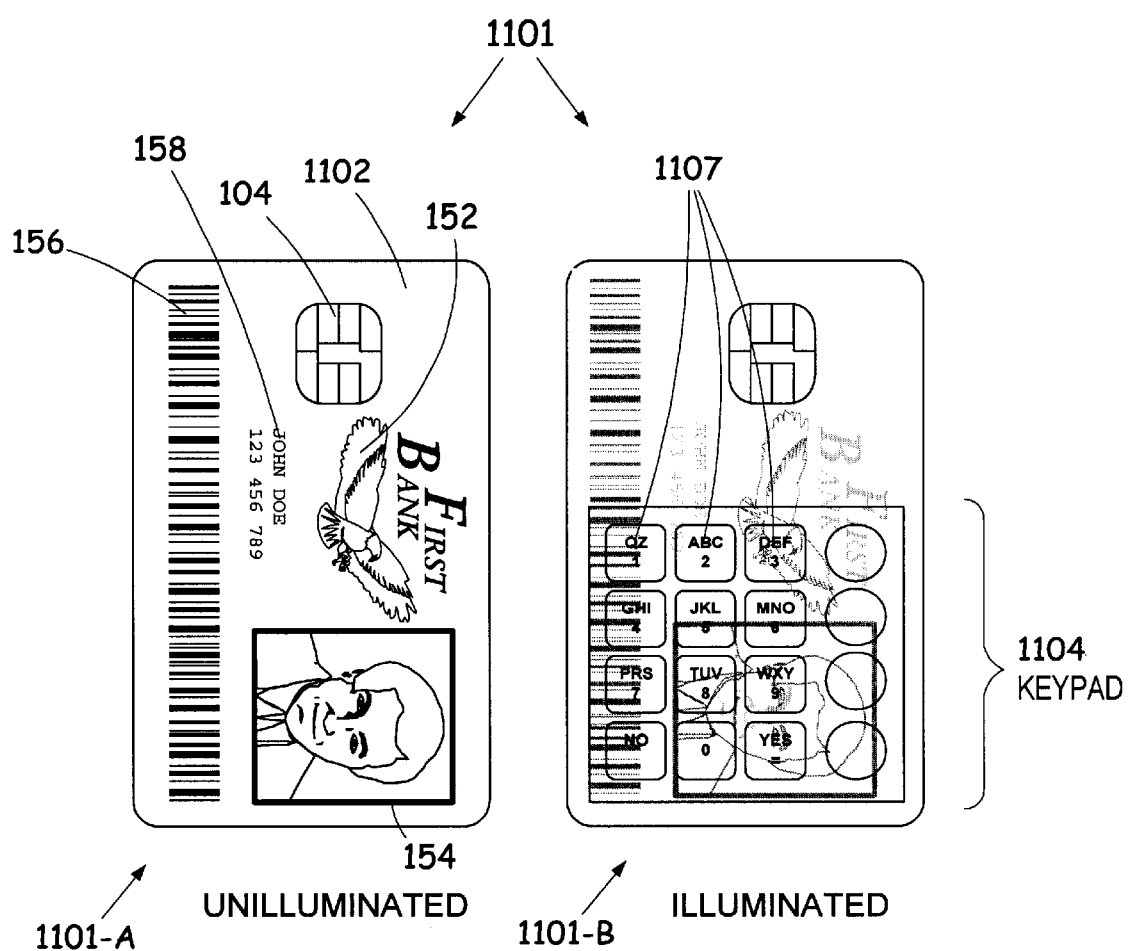
FIG. 16B shows the appearances of a smart card having an internal light-emitting layer with conditionally visible identifying indicia, when the light-emitting layer is not illuminating the identifying indicia, and when the light-emitting layer is illuminating the identifying indicia.

FIG. 16B shows an unilluminated visual appearance 1101-A for smart card 1101 when light-emitting layer 1102-D is not emitting light. Logo 152, user photograph 154, user name and identifying information 158, and bar code 156 are all unobstructed by identifying indicia. An illuminated visual appearance 1101-B, however, reveals smart card keypad 1104 when light-emitting layer 1102-D emits light, during which time conditionally visible identifying indicia 1107 are visible through translucent top layer 1102-E (FIG. 16A). In this embodiment, smart card 1101 is normally disabled because the identifying indicia thereof are not visible to the user without electrical power, which smart card 1101 is unable to provide. When smart card 1101 is presented to the reader, the reader provides electrical power and thereby illuminates the conditionally visible identifying indicia to enable smart card 1101.

Smart Card Reader with Identifying Indicia on Overlaying Surface

Figure 17A:
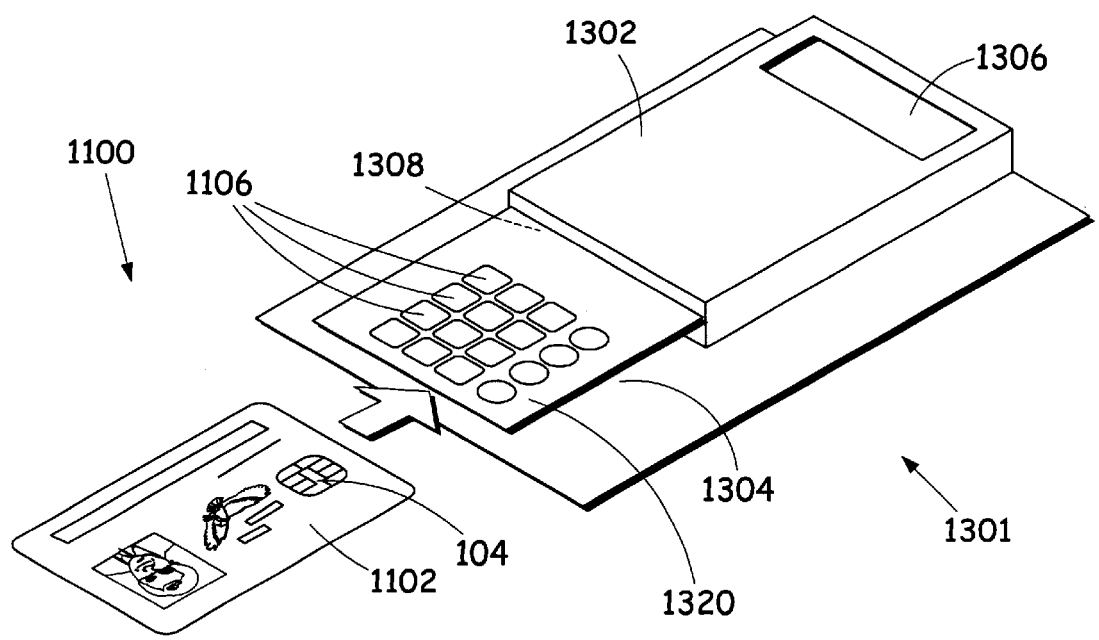
FIG. 17A shows an example of a reader having an overlaying surface with identifying indicia and a smart card ready for presentation having a smart card keypad but lacking identifying indicia.
Figure 17B:
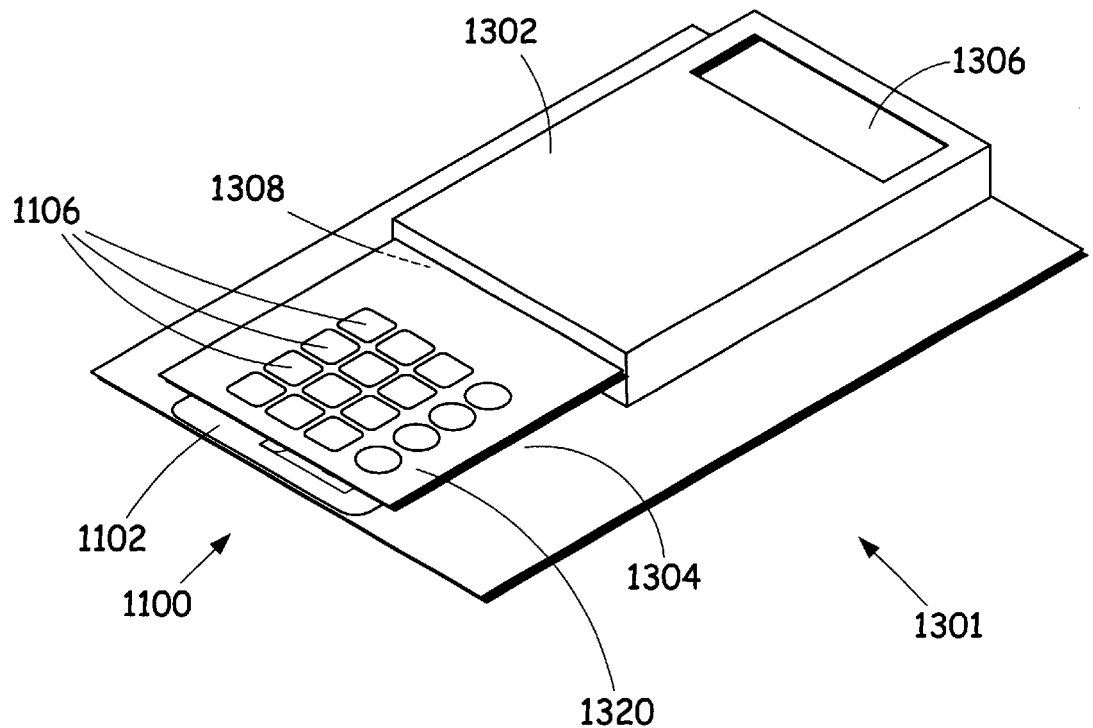
FIG. 17B shows the example reader having an overlaying surface with identifying indicia with a presented smart card according to the present invention.

FIG. 17A illustrates a further embodiment of the present invention for using smart card 1100 having smart card keypad 1104 (FIG. 14B) but lacking identifying indicia, by employing a reader 1301 having an overlaying surface 1320 with identifying indicia 1106 thereon in user access area 1304. Slot 1308 for inserting card body 1102 with electrical contacts 104 is underneath overlaying surface 1320, so that when smart card 1100 is presented to reader 1301, overlaying surface 1320 will be above smart card 1100 in user access area 1304, as illustrated in FIG. 17B. In this embodiment, overlaying surface 1320 carries identifying indicia 1106 to enable the user to enter the secret personal identification number. In such an embodiment, smart card keypad 1104 is able to receive an entry only when the smart card is beneath overlaying surface 1320. In this manner, smart card 1100 is normally disabled and is enabled when presented to reader 1301.

In order for the user to be able to enter the PIN into smart card keypad 1104 (FIG. 14B) while smart card 1100 is underneath overlaying surface 1320, it is necessary for smart card keypad 1104 to respond to the user's touch on overlaying surface 1320. There are various ways of configuring overlaying surface 1320 to enable this, as described in the following embodiments:

Deformable Overlaying Surface

Figure 18A:
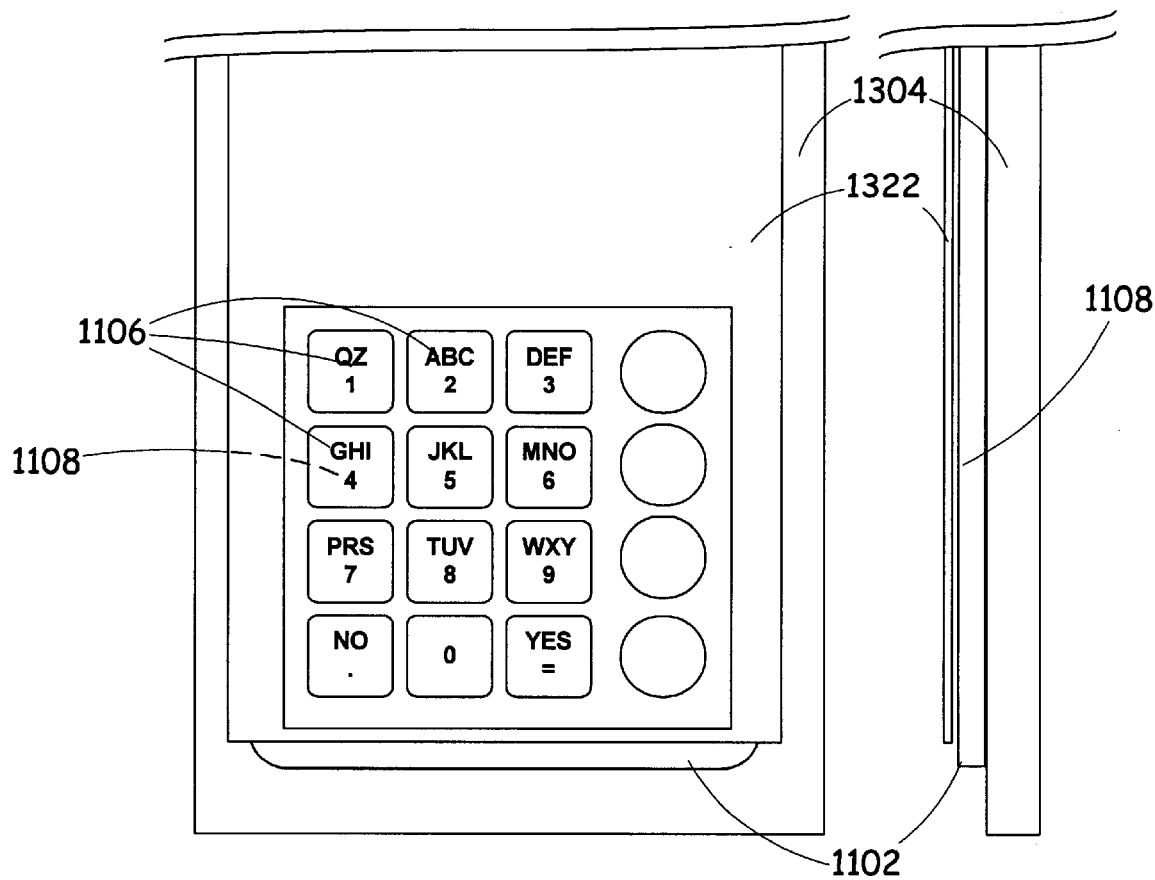
FIG. 18A shows top and side views of a deformable overlaying surface with identifying indicia over a smart card having a smart card keypad.
Figure 18B:
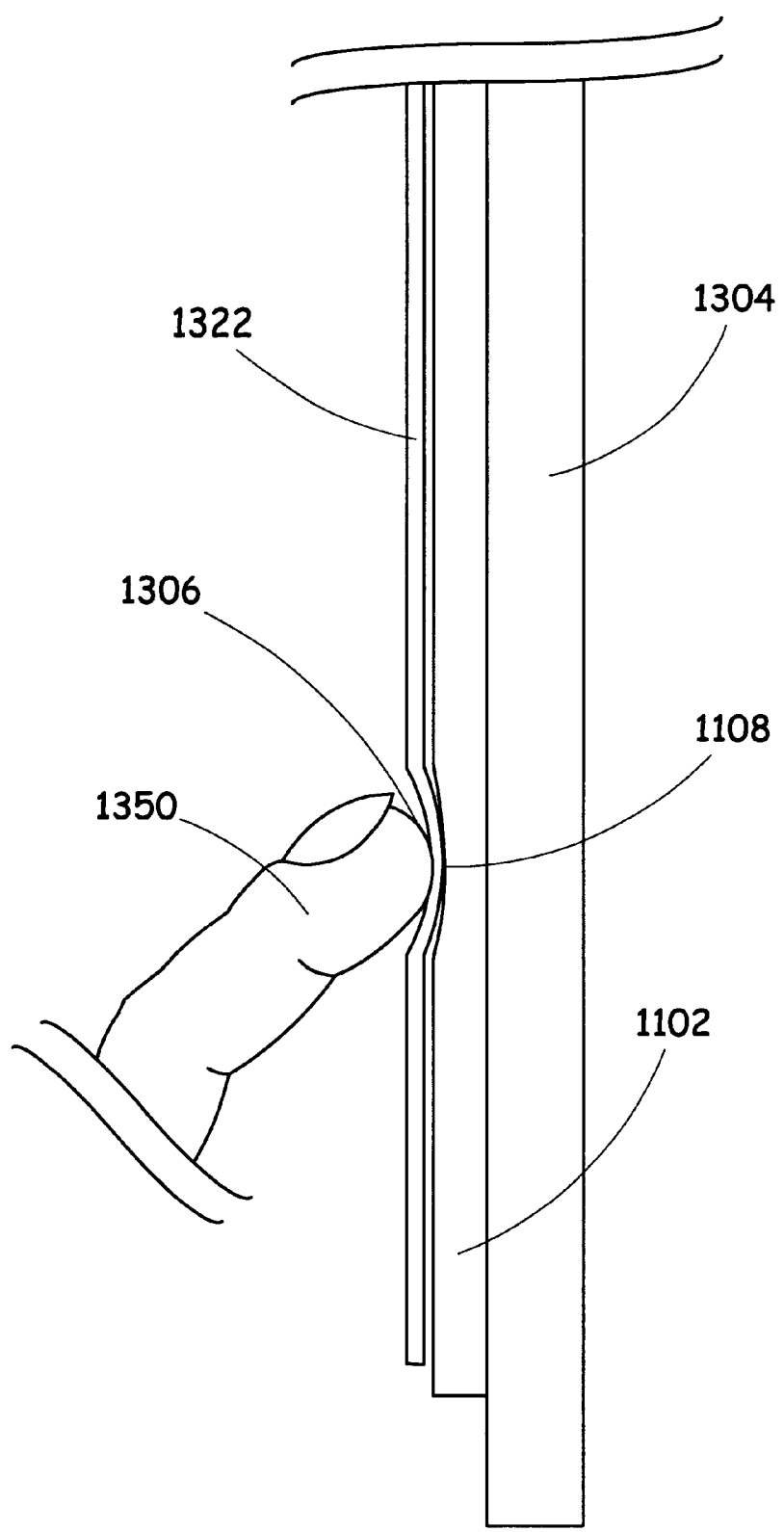
FIG. 18B shows a side view of a user entry on a deformable overlaying surface over a smart card having a smart card keypad.

FIG. 18A illustrates an embodiment utilizing a deformable overlaying surface 1322 with identifying indicia 1106. Deformable overlaying surface 1322 is normally a plane conforming to the plane surface of card body 1102 in user access area 1304, but it is possible to slightly distort the shape of deformable overlaying surface 1322 by applying a small amount of pressure with a finger or similar object. In a non-limiting example, deformable overlaying surface 1322 can be made out of a thin sheet of flexible plastic or like material. Identifying indicia 1106 are placed on deformable overlaying surface 1322 so that when card body 1102 is inserted into slot 1308 (FIG. 17A) for presentation to reader 1301 (FIG. 17B), typical smart card keypad region 1108 will be directly below the corresponding identifying indicia 1106. FIG. 18B shows how an entry is made by pressure from a finger 1350 onto deformable overlaying surface 1322 in the position of identifying indicia 1306 directly over region 1108.

Perforated Overlaying Surface

Figure 19A:
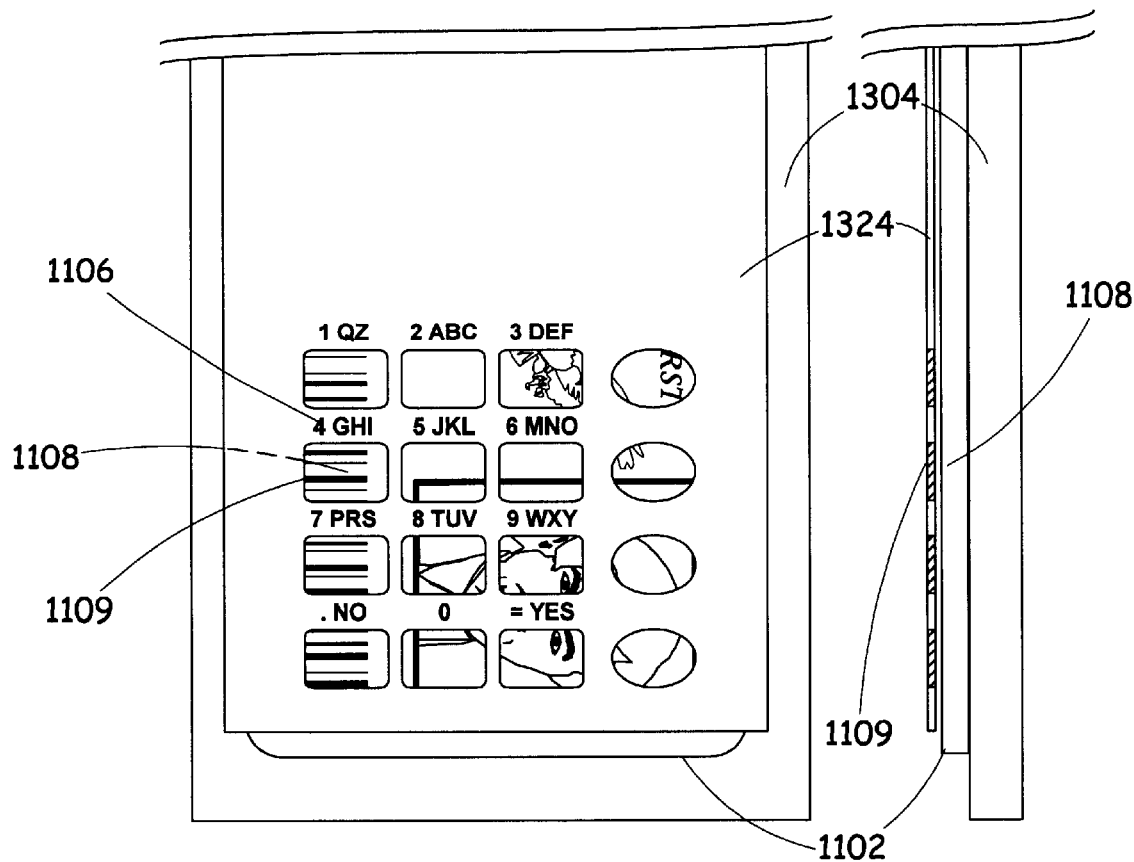
FIG. 19A shows top and side views of a perforated overlaying surface with identifying indicia over a smart card having a smart card keypad.
Figure 19B:
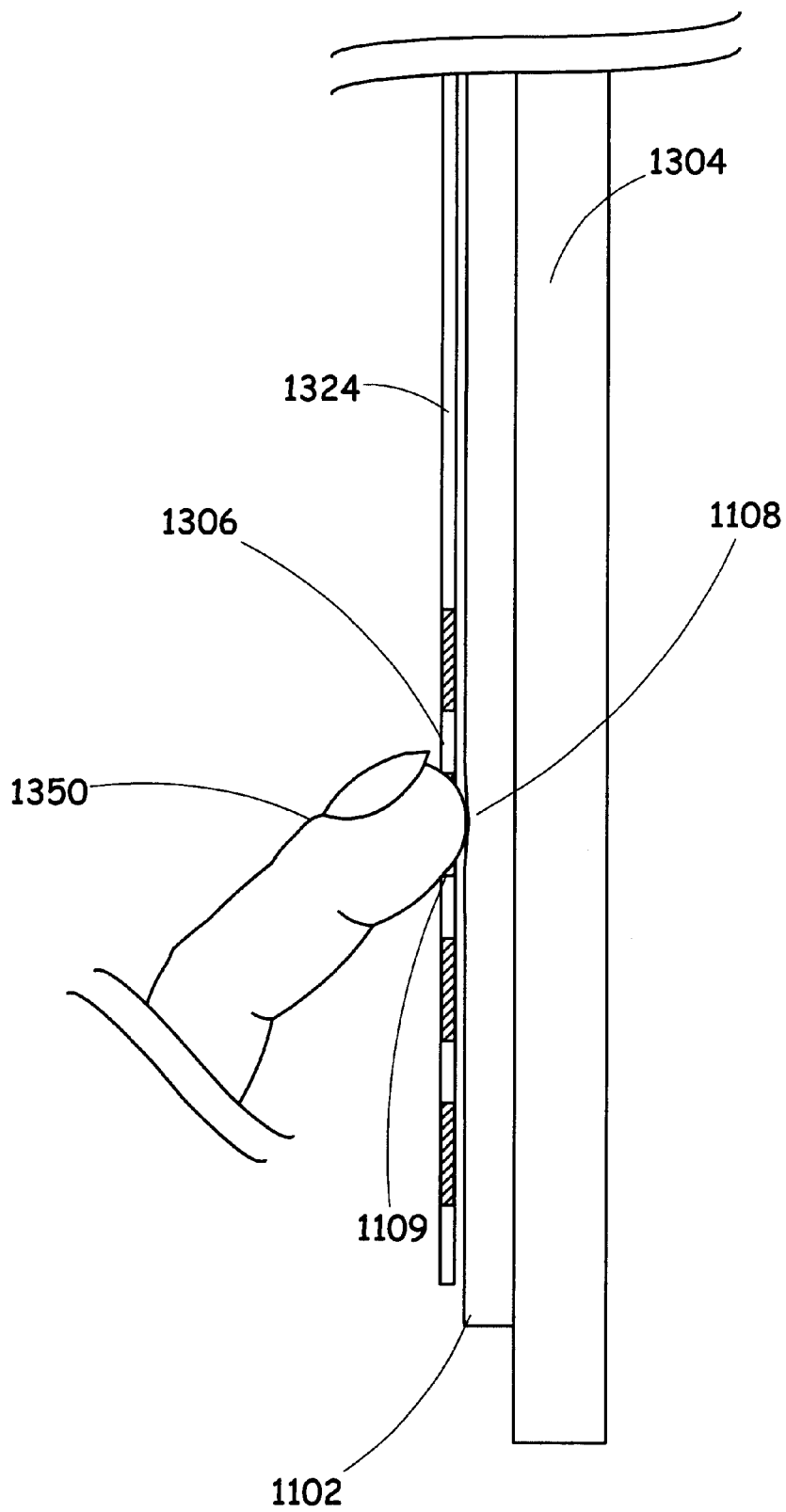
FIG. 19B shows a side view of a user entry on a perforated overlaying surface over a smart card having a smart card keypad.

FIG. 19A illustrates another embodiment utilizing a perforated overlaying surface 1324 with identifying indicia 1106. Perforated overlaying surface 1324 is a rigid plane conforming to the plane surface of card body 1102 in user access area 1304, but is perforated with holes, such as a typical hole 1109 through which a finger or similar object may be pushed. In a non-limiting example, perforated overlaying surface 1324 can be made out of a thin sheet of rigid metal or like material. Identifying indicia 1106 are placed on perforated overlaying surface 1324 above the holes so that when card body 1102 is inserted into slot 1308 (FIG. 17A) for presentation to reader 1301 (FIG. 17B), typical smart card keypad region 1108 will be directly below typical hole 1109 corresponding to identifying indicia 1106. FIG. 19B shows how an entry is made by inserting finger 1350 into hole 1109 below identifying indicia 1306 to put finger pressure directly on card body 1102 in region 1108.

Button Overlaying Surface

Figure 20A:
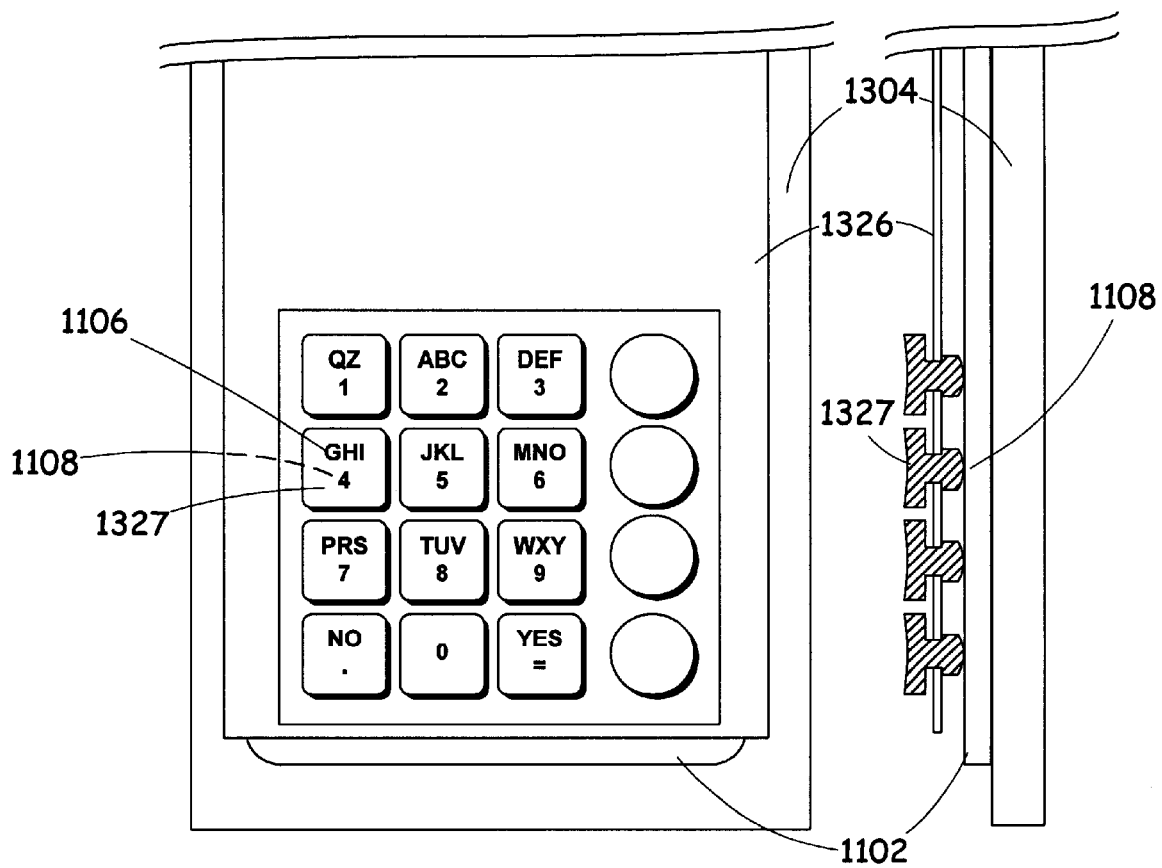
FIG. 20A shows top and side views of a button overlaying surface with identifying indicia over a smart card having a smart card keypad.
Figure 20B:
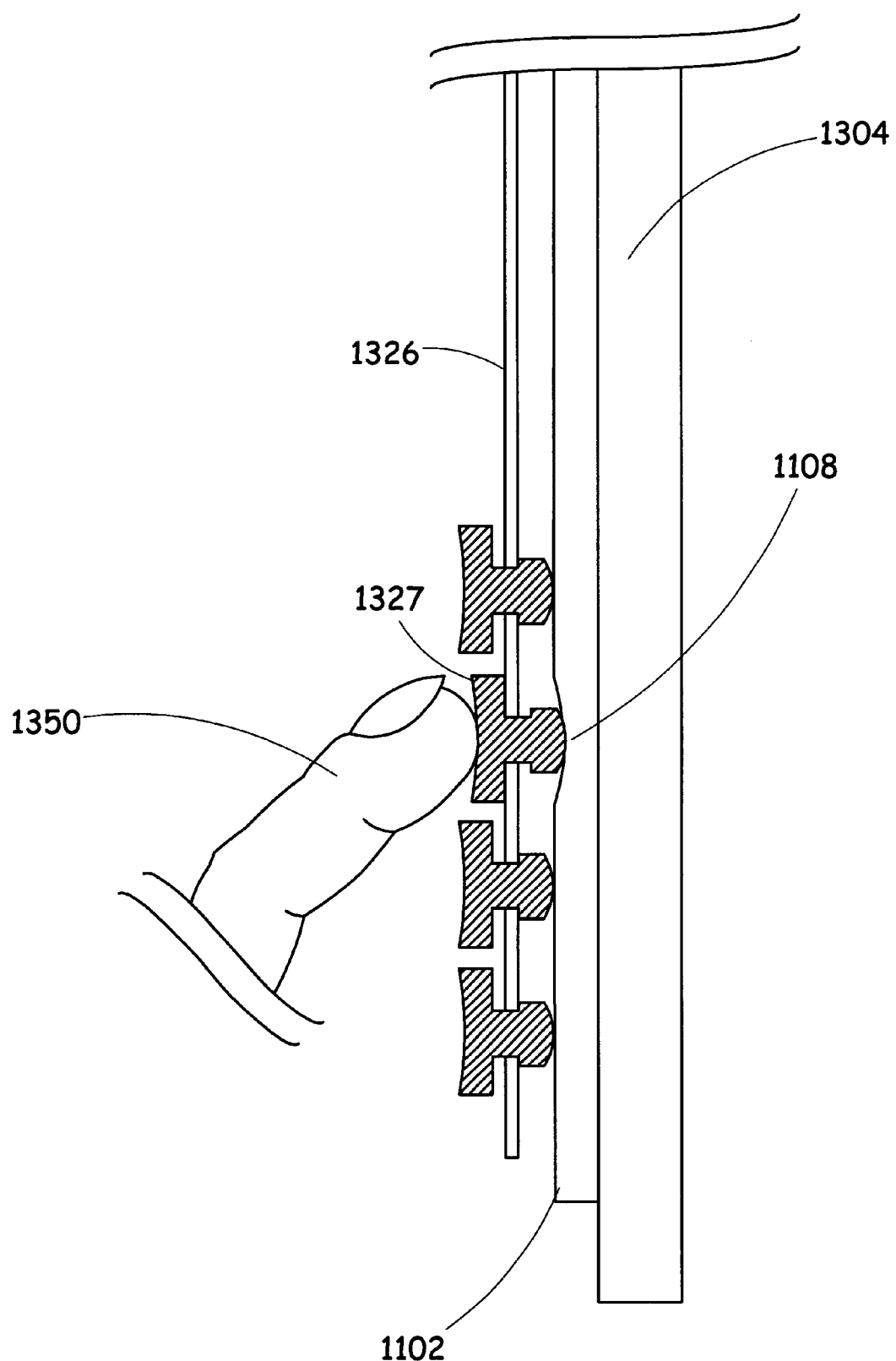
FIG. 20B shows a side view of a user entry on a button overlaying surface over a smart card having a smart card keypad.

FIG. 20A illustrates still another embodiment utilizing a button overlaying surface 1326 with identifying indicia 1106 on movable mechanical buttons, such as a typical button 1327. Button overlaying surface 1326 is a rigid plane above the plane surface of card body 1102 in user access area 1304, positioned so that the buttons, such as button 1327, rest lightly upon the surface of card body 1102. In a non-limiting example, button overlaying surface 1326 can be made out of a thin sheet of rigid metal or like material, with buttons of molded plastic or similar material. Identifying indicia 1106 are placed on typical button 1327. When card body 1102 is inserted into slot 1308 (FIG. 17A) for presentation to reader 1301 (FIG. 17B), typical smart card keypad region 1108 will be directly under typical button 1327 with identifying indicia 1106. FIG. 20B shows how an entry is made by depressing button 1327 with finger 1350 thereby transferring pressure directly on card body 1102 in region 1108.

An Even-Wearing Smart Card Keypad

One security weakness that is introduced by having a smart card keypad for entering the user's PIN is that if the smart card keypad is used exclusively for entry of the PIN, repetitive entry will gradually put signs of wear on the surface of the smart card corresponding to the sequence of symbols of the PIN. It may be possible, under certain circumstances, for someone who is not authorized to use the smart card to determine the secret personal identification number of a smart card by close examination of the wear on the card body above the smart card keypad. As an example, consider a 4-digit PIN with no repeated digits. There are 24 different combinations of numbers having these digits (4 factorial). If a smart card having such a PIN is used, signs of wear could appear on the surface of the card body in the locations of those four digits. If these signs of wear are sufficiently visible, then it will be possible to determine the secret personal identification number through trial and error in no more than 24 attempts. Although most smart cards are programmed to deactivate themselves after fewer erroneous PIN inputs than 24, the probability of successfully determining the user's secret personal identification number under such circumstances is unacceptably high.

To reduce or eliminate this security weakness, it is possible to use the smart card keypad for other data entry, such as for entering monetary amounts, thereby distributing the wear on the card body surface more evenly. Another way of distributing the wear on the card body surface more evenly is by selectively mapping the secret personal identification number to different configurations over the smart card keypad, as described below.

Figure 21A:
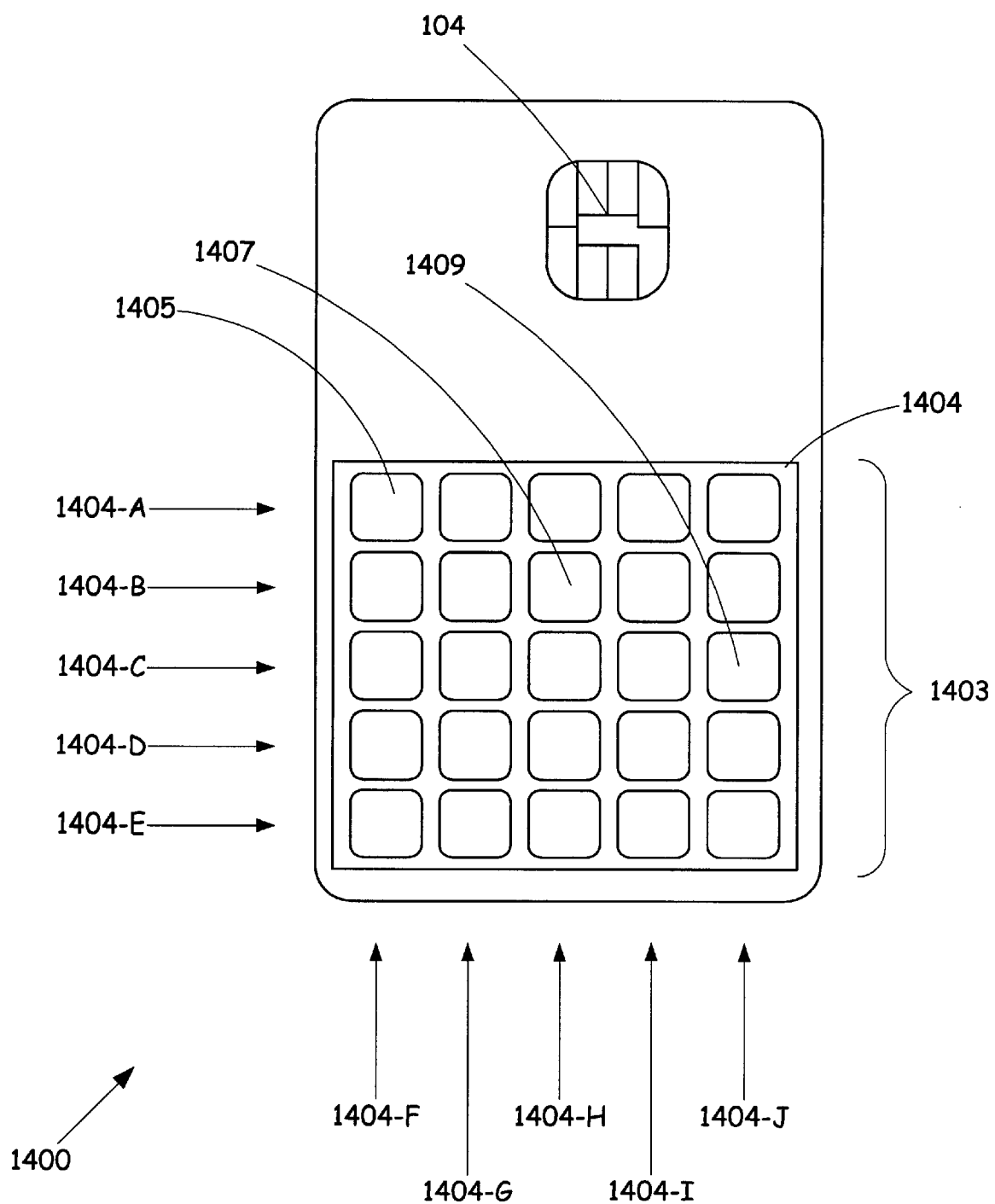
FIG. 21A shows a smart card having a smart card keypad with an augmented matrix of regions.

FIG. 21A shows a smart card 1400 having a smart card keypad 1404 whose regions are arranged in an augmented matrix 1403 of rows 1404-A, 1404-B, 1404-C, 1404-D, and 1404-E; and columns 1404-F, 1404-G, 1404-H, 1404-I, and 1404-J. A region 1405 in the upper left-hand corner of matrix 1403 is in row 1404-A and column 1404-F. A second region 1407 is in row 1404-B and column 1404-H. A third region 1409 is in row 1404-C and column 1404-J. The regions of matrix 1403 are not preassigned to specific symbols, but instead, specific symbols are mapped onto the regions of matrix 1403 when smart card 1400 is presented to a reader, according to a transformation function that depends on the individual reader. In this way, when a user enters a sequence of symbols into the smart card keypad the regions of the card body surface that are activated for that sequence of symbols may be different from one reader to another, thereby encouraging an even wearing of the card body surface and preventing an unauthorized person from deducing the secret personal identification number by close examination of the card body.

Figure 21B:
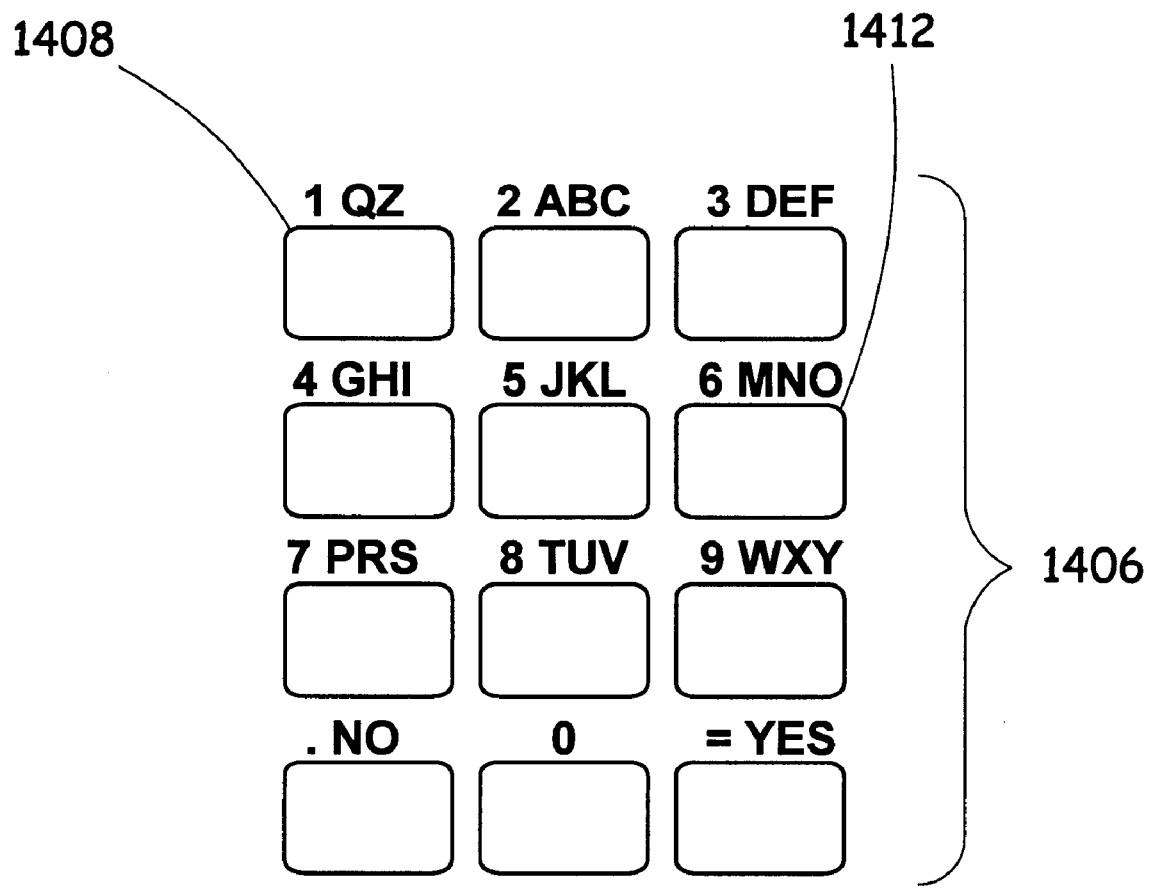
FIG. 21B shows a prior art extended keypad pattern.

FIG. 21B shows a prior art alphabetically-extended keypad pattern 1406, with a typical symbol location 1408 corresponding to the standard keypad pattern symbol '1'. In extended keypad pattern 1406, symbol location 1408 also corresponds to the symbols 'Q' and 'Z'. Likewise, a symbol location 1412 corresponds to the standard keypad pattern symbol '6' and to the symbols 'M', 'N', and 'O'. It should be noted that there are different prior art alphabetically-extended keypad patterns, and that there is currently no international standard for extending the standard numerical keypad to represent alphabetic characters. An optional US standard for such an extension is ANSI X3.118, and a variety of available international options are given in ISO 9564-1. Proposed international standards have been published in ISO/IEC 99958.2, in CCITT Recommendation E.161, and as European Banking Standard EBS-100. All of these publications are incorporated by reference for all purposes as if fully set forth herein.

Keypad pattern 1406 may be physically mapped onto matrix 1403 (FIG. 21A) by a variety of transformation functions, including, but not limited to: translation, rotation, reflection, permutation, and combinations thereof. The simplest of the transformation functions is translation, which preserves the arrangement of keypad pattern 1406 while changing only the position of the origin by a vector, denoted herein as the "offset vector". Translation is the only transformation function which has the property of preserving the precise arrangement of the keypad pattern relative to the user as the smart card is presented to the reader, and is therefore the preferred embodiment chosen for illustration in this non-limiting example. Furthermore, the mathematical properties of the translation transformation function are fully specified by the offset vector alone. In all cases, the mapping of keypad pattern 1406 onto matrix 1403 is associated with a physical template having specific physical locations relative to smart card 1400 for the regions of keypad pattern 1406. For each transformation function there is such a template.

Figure 22A:
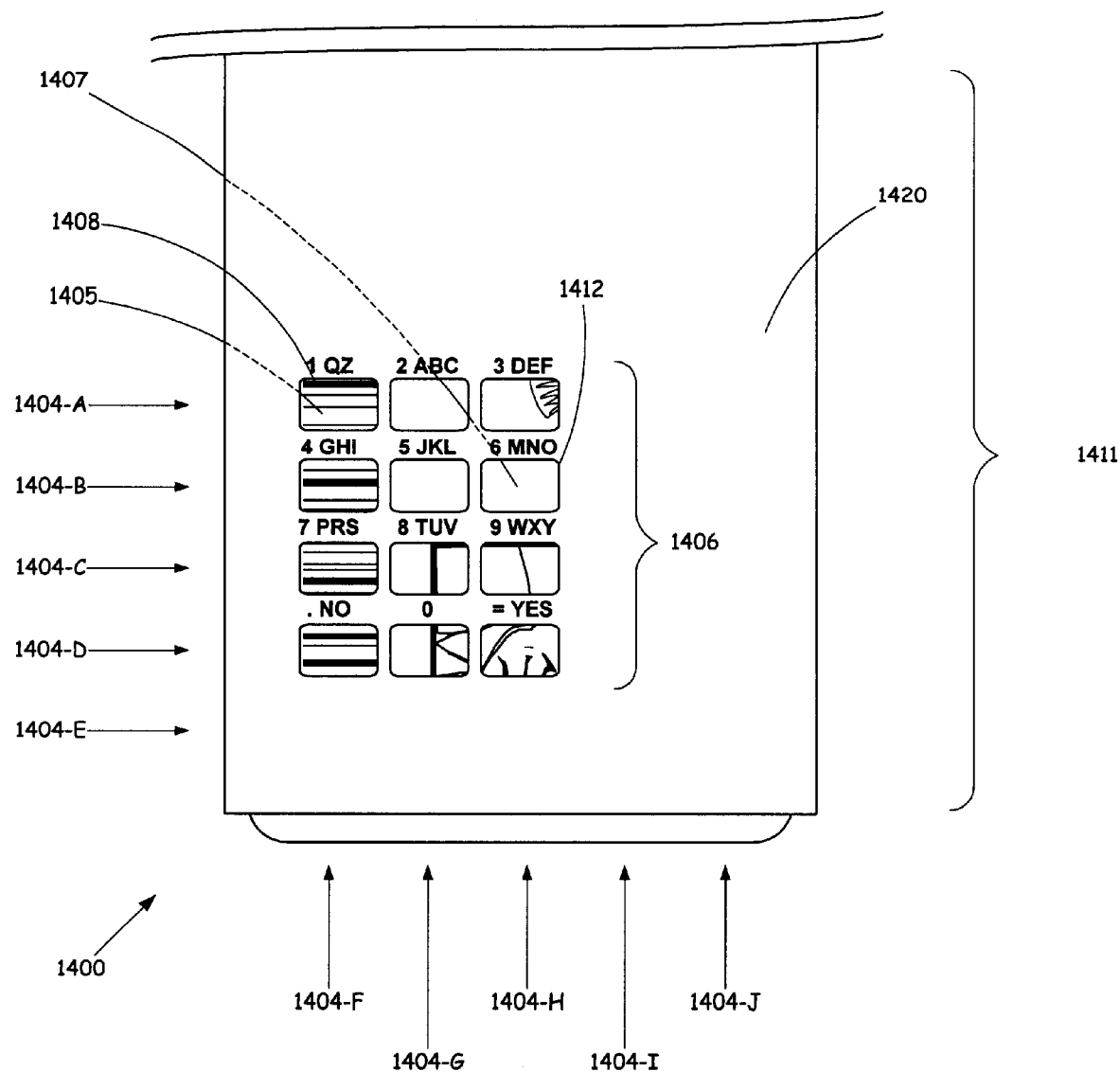
FIG. 22A shows a first transformed overlaying surface above a smart card having a smart card keypad with an augmented matrix of regions.

FIG. 22A shows a first mapping of keypad pattern 1406 onto matrix 1403 (FIG. 21A) by an overlaying surface 1420 over smart card 1400 with a template 1411. In the example of FIG. 22A the offset vector of the translation is {0 rows, 0 columns} so that keypad pattern symbol location 1408 is mapped onto matrix region 1405 at row 1404-A and column 1404-F. Likewise, keypad pattern symbol location 1412 is mapped onto matrix region 1405 at row 1404-B and column 1404-H.

Figure 22B:
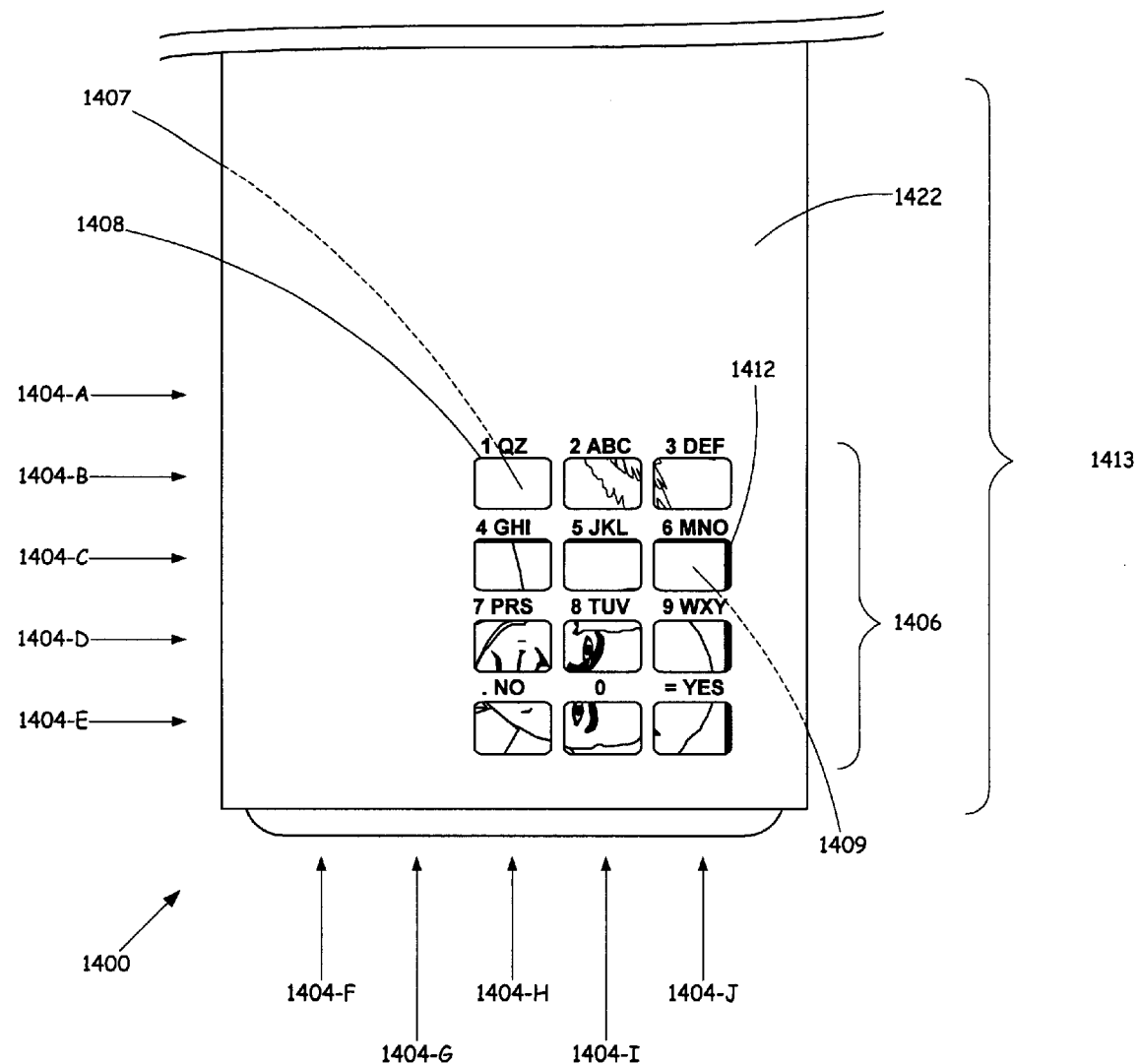
FIG. 22B shows a second transformed overlaying surface above a smart card having a smart card keypad with an augmented matrix of regions.

Next, FIG. 22B shows a second mapping of keypad pattern 1406 onto matrix 1403 (FIG. 21A) by an overlaying surface 1422 over smart card 1400 with a template 1413. In the example of FIG. 22B the offset vector of the translation is {1 row, 2 columns} so that keypad pattern symbol location 1408 is mapped onto matrix region 1407 at row 1404-B and column 1404-H. Likewise, keypad pattern symbol location 1412 is mapped onto matrix region 1409 at row 1404-C and column 1404-J.

Figure 23:
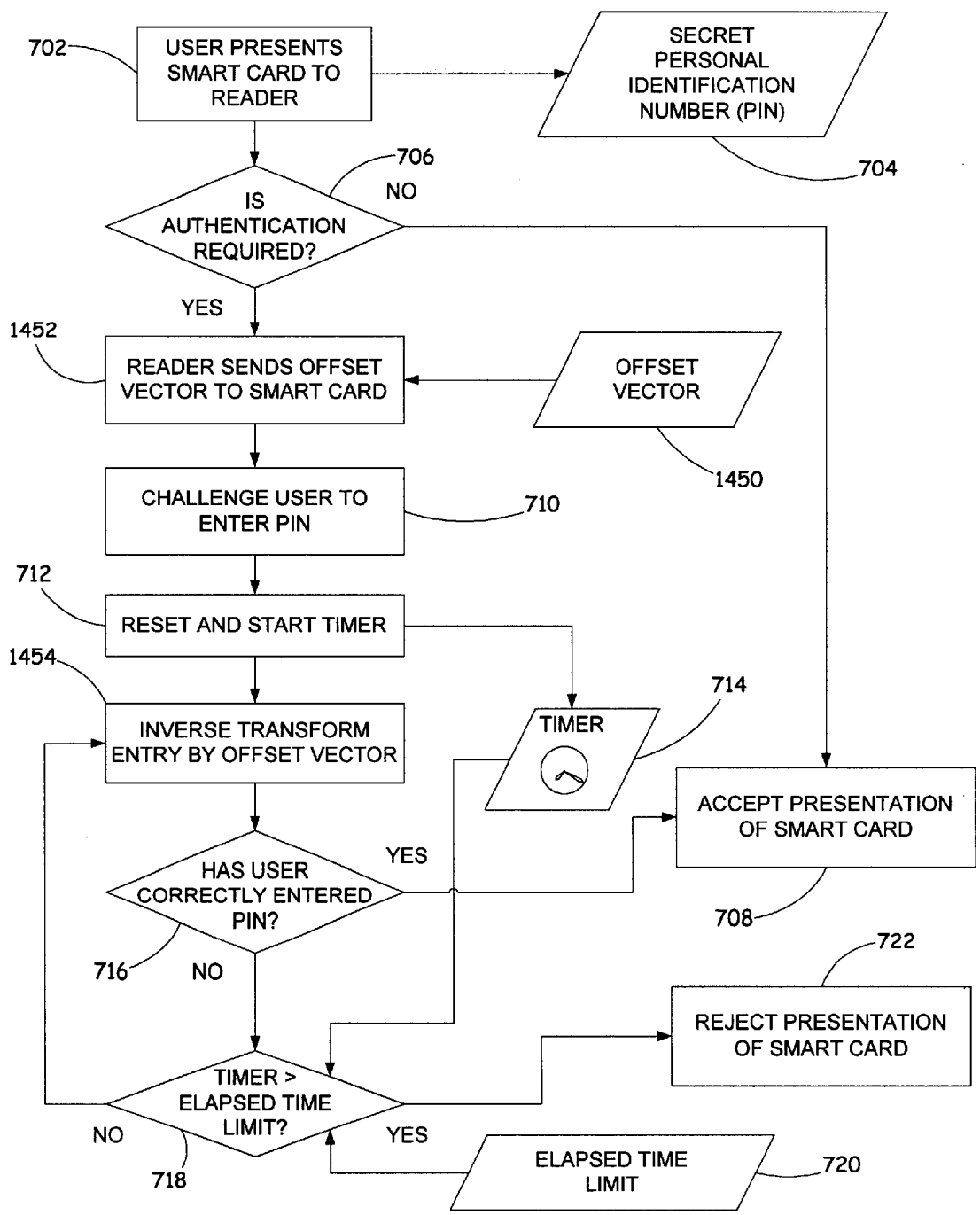
FIG. 23 is a flowchart showing the conceptual steps of an authentication method for use with a transformed overlaying surface above a smart card having a smart card keypad with an augmented matrix of regions.

It is apparent that a user who enters a given PIN for smart card 1400 will enter the PIN into different regions on the card body of smart card 1400, depending on which overlaying surface is used (such as overlaying surface 1420, overlaying surface 1422, etc.). In order to authenticate the user properly, then, smart card 1400 needs the mapping utilized by the overlaying surface in order to determine the sequence of symbols which was entered by the user. In the non-limiting example of a translation, the method is illustrated conceptually in FIG. 23, which shows a flowchart similar to that of FIG. 6, but which furthermore takes the transformation function into account. The new features of FIG. 23 include an offset vector 1450, and a step 1452 in which the reader sends offset vector 1452 to the smart card. Then, in another new step 1454, offset vector 1450 is used to inverse transform the entry back into the PIN entered by the user.

Overlaying surface 1420 (FIG. 22A) and overlaying surface 1422 (FIG. 22B) are shown as perforated overlaying surfaces, but the principles described above apply equally to all overlaying surfaces. Similarly, the transformation function has been illustrated as a translation, but all other transformation functions are also applicable. In practice, a large number of readers would have randomly-assigned transformation functions and would communicate their specific transformation function to the smart card so that the entry by the user could be inverse transformed to obtain the PIN as entered by the user.

A user which presents his or her smart card to a variety of such readers will enter the secret personal identification number in different positions on the card body, thereby distributing the wear on the card body evenly for increased security.

Smart Card Reader with User Access Area and Reader Keypad

Figure 24A:
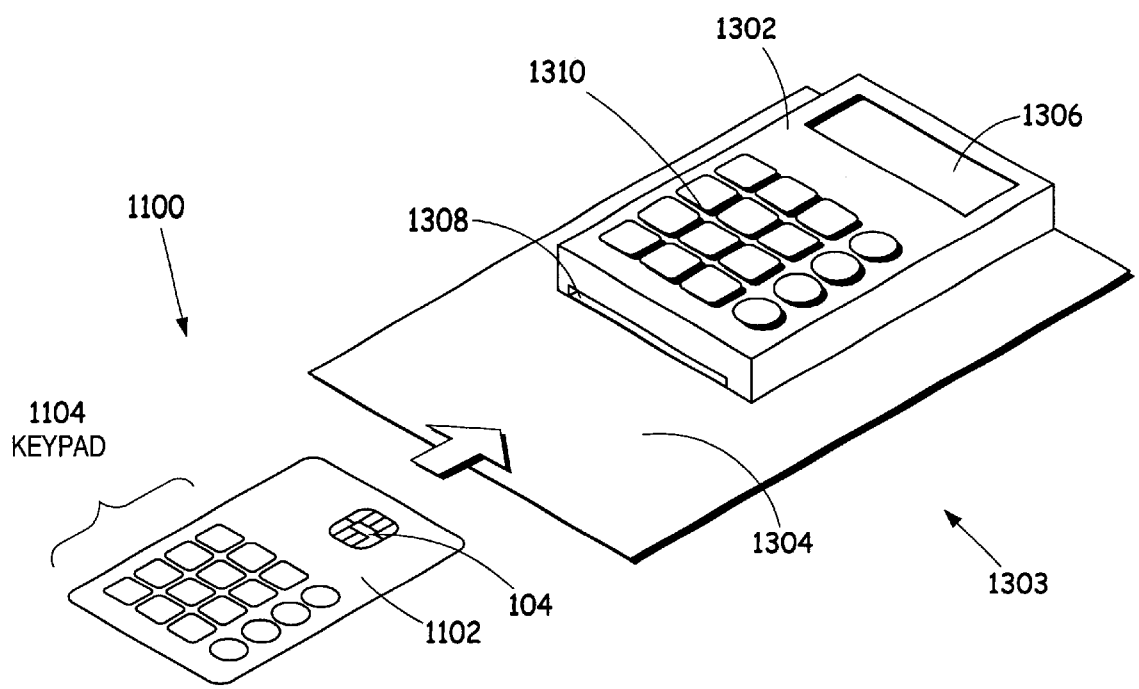
FIG. 24A shows an example of a reader having a reader keypad as well as a user access area, for compatibility with a conventional smart card as well as with a smart card having a smart card keypad according to the present invention.
Figure 24B:
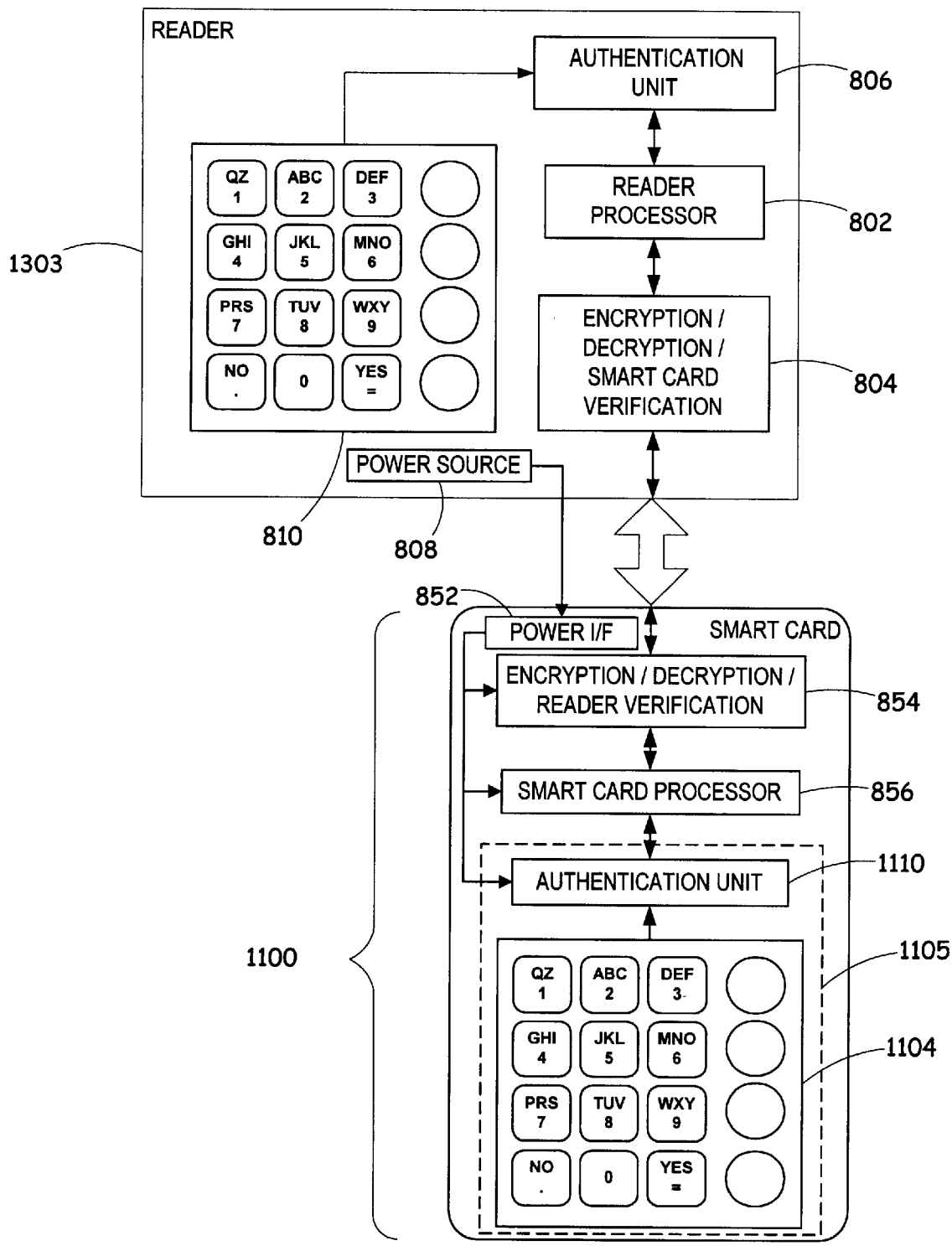
FIG. 24B is a conceptual block diagram of communications between a smart card according to the present invention and a reader having a reader keypad as well as a user access area.

In yet another embodiment, as illustrated in FIG. 24A and FIG. 24B, a reader 1303 has both a user access area 1304 as well as a conventional reader keypad 1310. In this manner, reader 1303 can be used both with a smart card having a smart card keypad as well as with a convention smart card While the invention has been described with respect to a limited number of embodiments, it will be appreciated that many variations, modifications and other applications of the invention may be made.

What is claimed is:

1. A system for authenticating a user, the system comprising:
    (a) a smart card for presentation by the user, said smart card being associated with a secret personal identification number and including an authentication module having a smart card keypad for receiving an entry of a sequence of symbols from the user, said authentication module also having an authentication unit for determining whether said sequence of symbols corresponds to said secret personal identification number, said authentication module being normally disabled, and wherein said smart card keypad excludes identifying indicia; and
    (b) a reader operative to accepting smart cards and exchanging data therewith, the reader being operative to enable said authentication module upon receiving said smart card, said reader including identifying indicia to enable said entry of a sequence of symbols by said user upon said smart card being received by said reader.

2. The system as in claim 1, wherein said smart card excludes an internal source of electrical power.

3. The system as in claim 1, wherein said smart card excludes a visual display.

4. The system as in claim 1, wherein said reader includes a user access area whereby the user can make said entry into said smart card keypad while said smart card is presented to said reader.

5. The system as in claim 2, wherein said smart card further includes an electrical power interface operative to receiving from said reader electrical energy for powering said authentication module while the user is making said entry into said smart card keypad.

6. The system as in claim 1, wherein said smart card keypad excludes identifying indicia.

7. The system as in claim 6, wherein said smart card further includes:
    (i) light-emitting means operative to illuminating said smart card keypad while an entry is being made into said smart card keypad; and
    (ii) conditionally visible identifying indicia which are visible when illuminated by said light-emitting means.

8. The system as in claim 1, wherein said user access area further comprises an overlaying surface above said smart card keypad when said smart card is presented to said reader, and which permits the user to make said entry into said smart card keypad through said overlaying surface, said overlaying surface having identifying indicia thereon.

9. The system as in claim 8, further comprising a plurality of readers, wherein, for each of said plurality of readers, said overlaying surface is mapped into said user access area by a transformation function which is preselected from a plurality of transformation functions and having a physical template preselected from a plurality of physical templates, wherein said reader is operative to communicating said transformation function to said smart card when said smart card is presented to said reader, and wherein said smart card is operative to receiving said entry of said secret personal identification number transformed in accordance with said transformation function.

10. The system as in claim 9, wherein said transformation function is a translation specified by an offset vector.

11. The system as in claim 8, wherein said overlaying surface is deformable, permitting the user to make said entry into said smart card keypad through said overlaying surface by deforming said overlaying surface.

12. The system as in claim 8, wherein said overlaying surface is perforated by at least one hole, permitting the user to make said entry into said smart card keypad through said at least one hole.

13. A reader for accepting and exchanging data with a smart card associated with a secret personal identification number, the smart card including a smart card keypad for making an entry of the secret personal identification number, wherein the smart card keypad excludes identifying indicia, the reader comprising:
    (a) a user access area whereby the secret personal identification number can be entered into the smart card keypad while the smart card is presented to the reader, and
    (b) an overlaying surface above the smart card keypad when the smart card is presented to the reader, and which permits the user to make the entry of the secret personal identification number into the smart card keypad through said overlaying surface, said overlaying surface having identifying indicia thereon.

14. The reader as in claim 13, furthermore comprising a reader keypad for entering the secret personal identification number into a device lacking a smart card keypad.

15. The reader as in claim 13, wherein said overlaying surface is mapped into said user access area by a transformation function preselected from a plurality of transformation functions and having a physical template preselected from a plurality of physical templates, and wherein the reader is operative to sending said transformation function to the smart card upon presentation of the smart card.

16. The reader as in claim 15, wherein said transformation function is a translation specified by an offset vector selected from a plurality of vectors, and wherein the reader is operative to sending said offset vector to the smart card.

17. The reader as in claim 13 wherein said overlaying surface is deformable, permitting the user to make the entry of the secret personal identification number into the smart card keypad through said overlaying surface by deforming said overlaying surface.

18. The reader as in claim 13 wherein said overlaying surface is perforated by at least one hole, permitting the user to make the entry of the secret personal identification number into the smart card keypad through said at least one hole.

19. A smart card for presentation to, acceptance by, and exchanging data with a reader, the smart card being associated with a secret personal identification number, the smart card comprising an authentication module including a smart card keypad for receiving an entry of a sequence of symbols while the smart card is presented to the reader and an authentication unit for determining whether said sequence of symbols corresponds to said secret personal identification number, said authentication module being normally disabled and being enabled when the smart card is presented to the reader, and wherein said smart card keypad excludes identifying indicia.

20. The smart card as in claim 19, furthermore comprising an electrical power interface operative to receiving from the reader electrical energy for powering said authentication module while said entry is being made into said smart card keypad.

21. The smart card as in claim 19, furthermore operative to receiving a transformation function from said reader and inverse transforming said entry according to said transformation function.

22. The smart card as in claim 21, wherein said transformation function is a translation, and wherein the smart card is operative to receiving an offset vector from said reader.

23. The smart card as in claim 19, furthermore comprising:
   (a) light-emitting means operative to illuminating said smart card keypad while an entry is being made into said smart card keypad; and
   (b) conditionally visible identifying indicia which are visible when illuminated by said light-emitting means.

24. A method for authenticating the user of a smart card, the smart card being associated with a secret personal identification number and including a smart card authentication module having a smart card keypad wherein said smart card keypad excludes identifying indicia, the method comprising the steps of:
   (a) normally disabling the smart card authentication module;
   (b) providing at least one reader operative to accepting the smart card;
   (c) having the user present the smart card to said at least one reader;
   (d) enabling the smart card authentication module while the smart card is presented to said at least one reader;
   (e) providing identifying indicia for use with said smart card keypad;
   (f) challenging the user to enter the secret personal identification number into the smart card keypad while the smart card is presented to said at least one reader;
   (g) receiving a sequence of symbols via the smart card keypad;
   (h) determining the user to be an authorized user only if said sequence of symbols corresponds to the secret personal identification number; and
   (i) rejecting attempts by the user to perform an authentication when the smart card is not presented to said at least one reader.

25. The method as in claim 24, wherein said at least one reader is furthermore operative to sending a transformation function to the smart card, the method furthermore comprising the step of transforming said sequence of symbols in accordance with said transformation function.

26. The method as in claim 25, wherein said transformation function is a translation specified by an offset vector.

* * * * *